US012691474B2

(12) United States Patent
Nushart et al.

(10) Patent No.: US 12,691,474 B2
(45) Date of Patent: Jul. 28, 2026

(54) PRESSURE WASHER WITH CONTAINER HOLDER

(71) Applicant: Generac Power Systems, Inc., Waukesha, WI (US)

(72) Inventors: Peter Nushart, Waukesha, WI (US); Matt Fritsch, Madison, WI (US); Keith Muellenbach, Waukesha, WI (US)

(73) Assignee: Generac Power Systems, Inc., Waukesha, WI (US)

(*) Notice: Subject to any disclaimer, the term of this patent is extended or adjusted under 35 U.S.C. 154(b) by 254 days.

(21) Appl. No.: 18/363,370

(22) Filed: Aug. 1, 2023

(65) Prior Publication Data

US 2024/0024926 A1 Jan. 25, 2024

Related U.S. Application Data

(63) Continuation of application No. 17/024,940, filed on Sep. 18, 2020, now Pat. No. 11,752,527.

(Continued)

(51) Int. Cl.

*B08B 3/02* (2006.01)
*B05B 7/00* (2006.01)

(Continued)

(52) U.S. Cl.

CPC ............ *B08B 3/026* (2013.01); *B05B 7/0093* (2013.01); *B05B 7/30* (2013.01); *B08B 3/08* (2013.01); *B08B 13/00* (2013.01); *E01H 1/101* (2013.01)

(58) Field of Classification Search

CPC ........... B08B 3/026; B08B 3/08; B08B 13/00; B05B 7/0093; B05B 7/30; E01H 1/101

See application file for complete search history.

(56) References Cited

U.S. PATENT DOCUMENTS 3,940,065 A 2/1976 Ware et al.
6,109,277 A 8/2000 Linton et al.

(Continued)

FOREIGN PATENT DOCUMENTS

AU 2005214976 B2 9/2005
CN 108212954 A * 6/2018 ............. B08B 13/00

(Continued)

OTHER PUBLICATIONS

CN108212954 translation (Year: 2018).*

(Continued)

*Primary Examiner* — Michael E Barr
*Assistant Examiner* — Lauren G Orta
(74) *Attorney, Agent, or Firm* — Merchant & Gould P.C.

(57) ABSTRACT

A mobile pressure washer can include a wheeled chassis, a power plant supported by the wheeled chassis, a fluid pump a fluid pump coupled to and driven by the power plant, a sprayer in fluid communication with the pump, a chemical solution container, and a container holder for supporting the chemical solution container. In some examples, the container holder has a frame operably connected to the wheeled chassis and has a container support mounted to the frame, the container support including a base wall and a sidewall defining a receptacle for receiving and supporting a container in fluid communication with the pump.

19 Claims, 32 Drawing Sheets

Related U.S. Application Data

(60) Provisional application No. 62/983,271, filed on Feb. 28, 2020, provisional application No. 62/902,305, filed on Sep. 18, 2019.

(51) Int. Cl.

| | |
|---|---|
| ***B05B 7/30*** | (2006.01) |
| ***B08B 3/08*** | (2006.01) |
| ***B08B 13/00*** | (2006.01) |
| ***E01H 1/10*** | (2006.01) |

(56) References Cited

U.S. PATENT DOCUMENTS

| | | | | |
|---|---|---|---|---|
| 7,198,204 | B2 | 4/2007 | Bennett et al. | |
| 7,406,739 | B2 | 8/2008 | Guest et al. | |
| 7,943,040 | B2 | 5/2011 | Taylor et al. | |
| 8,480,888 | B2 | 7/2013 | Ashley et al. | |
| 8,602,323 | B2 | 12/2013 | Bearup et al. | |
| 8,721,805 | B2 | 5/2014 | Barrios et al. | |
| 8,783,587 | B2 | 7/2014 | Bearup et al. | |
| 8,888,016 | B2 | 11/2014 | Linton et al. | |
| D726,382 | S | 4/2015 | Taylor et al. | |
| D735,959 | S | 8/2015 | Linton et al. | |
| D740,501 | S | 10/2015 | Taylor et al. | |
| 9,301,661 | B2 | 4/2016 | Venard et al. | |
| 9,451,861 | B2 | 9/2016 | Pedlar et al. | |
| 9,510,721 | B2 | 12/2016 | Pedlar et al. | |
| 9,724,734 | B2 | 8/2017 | Linton et al. | |
| 9,877,624 | B2 | 1/2018 | Venard et al. | |
| 9,877,625 | B2 | 1/2018 | Venard et al. | |
| D839,512 | S | 1/2019 | Bearup et al. | |
| 10,188,250 | B2 | 1/2019 | Venard et al. | |
| 2006/0064844 | A1 | 3/2006 | Venard et al. | |
| 2009/0188535 | A1 | 7/2009 | Taylor et al. | |
| 2010/0224699 | A1 | 9/2010 | Gaddis et al. | |
| 2010/0326103 | A1 | 12/2010 | Stamm et al. | |
| 2011/0036418 | A1 * | 2/2011 | Hendy | B08B 3/026 137/335 |
| 2011/0237373 | A1 | 9/2011 | Barrios et al. | |
| 2015/0001820 | A1 | 1/2015 | Cormier | |
| 2017/0217356 | A1 | 8/2017 | Yim et al. | |
| 2017/0304873 | A1 | 10/2017 | Luby et al. | |
| 2017/0340183 | A1 | 11/2017 | Pedlar et al. | |
| 2018/0110389 | A1 | 4/2018 | O'Kane | |
| 2018/0221897 | A1 * | 8/2018 | Collins | B01F 25/60 |
| 2018/0272392 | A1 | 9/2018 | Jaramillo et al. | |
| 2018/0274535 | A1 | 9/2018 | Jaramillo | |
| 2018/0290180 | A1 | 10/2018 | Luby | |

FOREIGN PATENT DOCUMENTS

| | | | |
|---|---|---|---|
| EP | 1393824 | 3/2004 | |
| EP | 1393824 A2 * | 3/2004 | B08B 3/026 |

OTHER PUBLICATIONS

Kaercher K3 Follow Me Pressure Washer Website Information, https://www.kaercher.com/us/home-garden/electric-pressure-washers/k-3-follow-me-16019900.html, dated Aug. 19, 2018.

Snow Joe, LLC, Opertator's Manual for SunJoe Ion, Cordless Go-Anywhere Pressure Washer, 24 pages, 2016.

* cited by examiner

PRESSURE WASHER WITH CONTAINER HOLDER

CROSS-REFERENCE TO RELATED APPLICATIONS

This application is a continuation of U.S. patent application Ser. No. 17/024,940, filed Sep. 18, 2020, entitled PRESSURE WASHER WITH CONTAINER HOLDER, which claims priority to U.S. Provisional Application No. 62/983,271, filed Feb. 28, 2020, entitled PRESSURE WASHER WITH CONTAINER HOLDER, and claims priority to U.S. Provisional Application No. 62/902,305, filed Sep. 18, 2019, entitled PRESSURE WASHER WITH BUCKET HOLDER, the disclosures of which are hereby incorporated by reference in their entireties.

BACKGROUND

Mobile pressure washers generate a pressurized spray that can be used to clean and remove unwanted material from a surface. For example, a pressure washer is sometimes used to clean exterior siding, a deck, a driveway, or a vehicle by removing dirt and debris. At higher pressures a pressure washer can be used to remove loose paint or to strip paint or other materials from a surface.

For some applications it is desirable to apply a chemical solution, and many pressure washers include a small tank for storing a chemical solution. In use, the pressure washer is typically connected to a hose or other water line that provides a supply of water, which is then mixed with the chemical solution inside the pressure washer before being sprayed. However, such tanks typically have a small storage capacity and require frequent refilling for larger projects.

SUMMARY

In general terms, this disclosure is directed to power equipment, such as a pressure washer. In some embodiments, and by non-limiting example, the pressure washer includes a container holder for storing a container, such as a bucket, containing a chemical solution that can be sprayed by the pressure washer.

In one example, a mobile pressure washer can include a wheeled chassis, a power plant supported by the wheeled chassis, a fluid pump a fluid pump coupled to and driven by the power plant, a sprayer in fluid communication with the pump, and a container holder having a frame operably connected to the wheeled chassis and having a container support mounted to the frame, the container support including a base wall and a sidewall defining a receptacle for receiving and supporting a container in fluid communication with the pump.

In some examples, the container holder includes a pivotable coupling connecting the frame to the wheeled chassis such that the container holder can be positioned between extended and storage positions.

In some examples, container holder further includes a locking mechanism that selectively locks the container holder in the extended and storage positions.

In some examples, the mobile pressure washer includes the container.

In some examples, the container is a bucket defining an interior volume of at least one gallon.

In some examples, the mobile pressure washer includes a manifold in fluid communication with the pump and the sprayer and a chemical solution hose having a first end inserted into the container to draw chemical solution from the container, and a second end connected to the manifold.

In some examples, the container holder is sized and shaped to receive a 5-gallon bucket.

In some examples, the container holder base plate is centered on a portion of the frame.

In some examples, the mobile pressure washer includes a strap removably connected to the sidewall, the strap being for securing the container into the container holder.

In some examples, the wheeled chassis includes at least three wheels.

In some examples, the pressure washer includes a handle assembly, the handle assembly being rotatable between an extended position and a storage position.

In some examples, the pressure washer includes a locking mechanism that selectively locks the handle in the extended and storage positions.

In one example, a mobile pressure washer can include a wheeled chassis, a power plant supported by the wheeled chassis, a fluid pump a fluid pump coupled to and driven by the power plant, a sprayer in fluid communication with the pump, and a container holder rotatably connected to the wheeled chassis, the container holder being rotatable between extended and storage positions and, when in the extended position, being configured to support and retain a container in fluid communication with the fluid pump.

In some examples, the container holder includes a pivotable coupling connecting the frame to the wheeled chassis such that the container holder can be positioned between the extended and storage positions.

In some examples, the container holder further includes a locking mechanism that selectively locks the container holder in the extended and storage positions.

In some examples, the container holder includes a frame operably connected to the wheeled chassis and a container support mounted to the frame, the container support including a base wall and a sidewall.

In some examples, the mobile pressure washer includes the container.

In some examples, the container is a bucket defining an interior volume of at least one gallon.

In some examples, the mobile pressure washer includes a manifold in fluid communication with the pump and the sprayer and a chemical solution hose having a first end inserted into the container to draw chemical solution from the container, and a second end connected to the manifold.

In some examples, the container holder is sized and shaped to receive a 5-gallon bucket.

In some examples, the container holder base plate is centered on a portion of the frame.

In some examples, the mobile pressure washer includes a strap removably connected to the sidewall, the strap being for securing the container into the container holder.

In some examples, the wheeled chassis includes at least three wheels.

In some examples, the pressure washer includes a handle assembly, the handle assembly being rotatable between an extended position and a storage position.

In some examples, the pressure washer includes a locking mechanism that selectively locks the handle in the extended and storage positions.

In one example, a mobile pressure washer includes a wheeled chassis, a manifold having a chemical solution inlet port and a water inlet port that receives and mixes water with the chemical solution, at least one motorized pump that pressurizes the mixed water and chemical solution to be sprayed from a spray gun, and a chemical solution bucket holder having a frame and bucket support, the frame being secured to the chassis and the bucket support being configured to support a chemical solution bucket thereon to store the chemical solution for delivery to the chemical solution inlet port.

In some examples, the mobile pressure washer includes a chemical solution hose having a first end insertable into the chemical solution bucket to draw the chemical solution from the chemical solution bucket, and a second end to transfer the chemical solution along a flow path toward the chemical solution inlet port.

In some examples, the chemical solution bucket holder further comprises a pivotable coupling connecting the chemical solution bucket holder frame to the wheeled chassis, the pivotable coupling supporting the chemical solution bucket holder in an extended position for supporting the chemical solution bucket holder and a storage position.

In some examples, the pivotable coupling includes a locking mechanism that selectively locks the chemical solution bucket holder in the extended and storage positions.

In some examples, the chemical solution bucket holder includes a bucket base plate and a sidewall defining a bucket receptacle configured to receive the chemical solution bucket, wherein the bucket receptacle is centered on a portion of the frame.

In some examples, the bucket receptacle is sized and shaped to receive a 5-gallon bucket.

In some examples, the mobile pressure washer includes a strap for securing the chemical solution bucket into the bucket receptacle.

In some examples, the wheeled chassis comprises at least three wheels.

In one example, a bucket holder for a mobile pressure washer includes a support frame, a base plate mounted to the support frame, a sidewall extending from the base plate, the sidewall and base plate defining a bucket receptacle for holding a bucket, and a coupling arrangement including a mounting bracket for mounting the bucket holder to the mobile pressure washer and a pivotable coupling member pivotably connected to the bracket and mounted to the frame, the pivotable coupling enabling the support frame to be rotated between an extended position and a storage position with respect to the mobile pressure washer.

In some examples, the bucket receptacle is sized to hold a five gallon bucket.

In some examples, the base plate is welded to the support frame.

In some examples, the bucket holder includes a locking mechanism that selectively locks the bucket holder in the extended and storage positions.

In some examples, the bucket holder includes a strap for securing the bucket into the bucket receptacle.

In one example, a method of operating a mobile pressure washer includes receiving and supporting a chemical solution bucket on a bucket holder, the bucket holder being mounted to a chassis of the mobile pressure washer, receiving water from a hose, transferring a chemical solution from the chemical solution bucket and mixing the chemical solution with the water, and spraying the mixed chemical solution and water.

In some examples, the method further includes adjusting the bucket holder from an extended position to a storage position after the chemical bucket is removed from the bucket holder.

DETAILED DESCRIPTION

Figure 1:
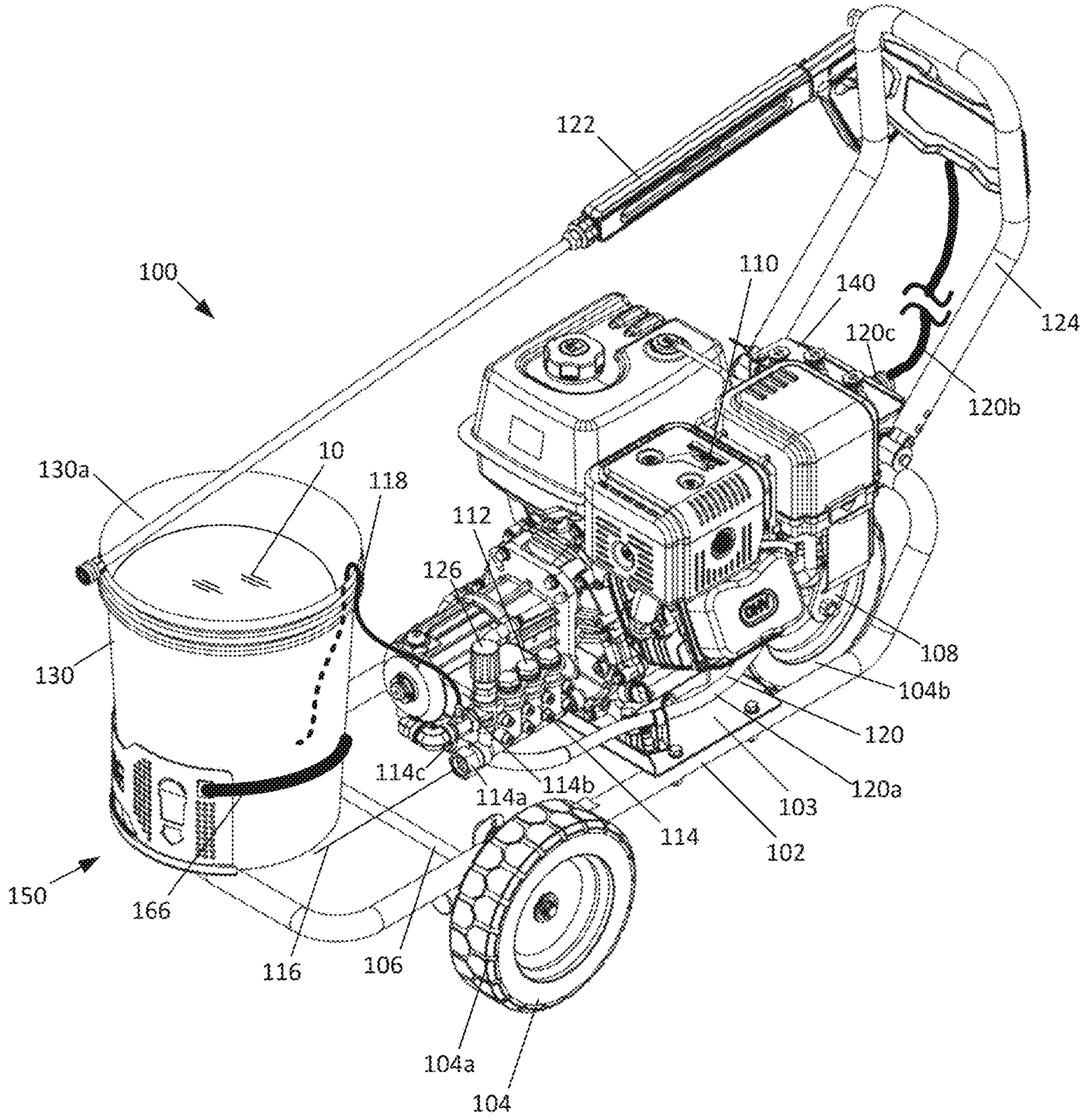
FIG. 1 is a top perspective view of an example mobile pressure washer including a container holder positioned in an extended position and including a handle assembly positioned in an extended position.
Figure 2:
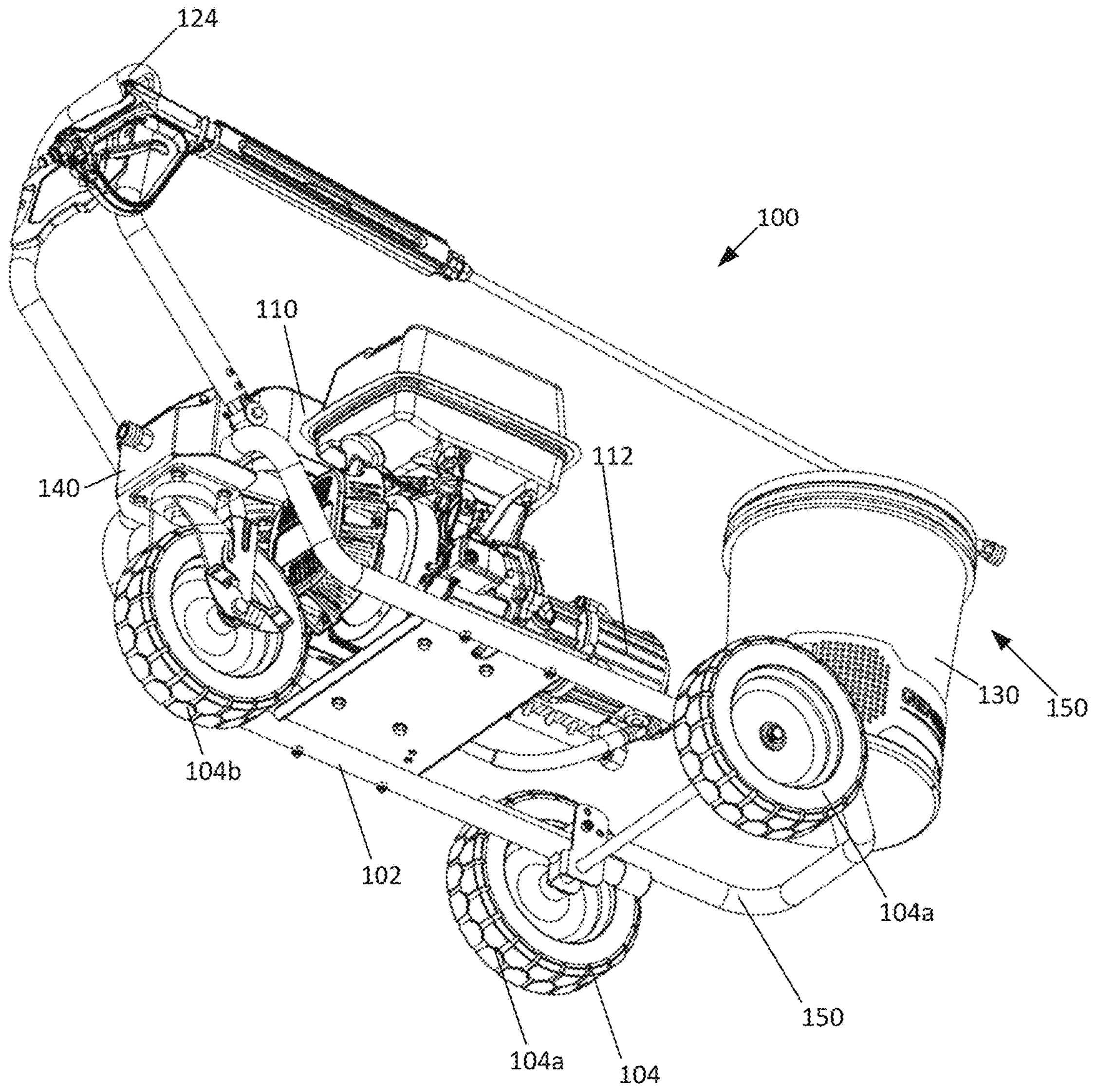
FIG. 2 is a bottom perspective view of the mobile pressure washer shown in FIG. 1.
Figure 3:
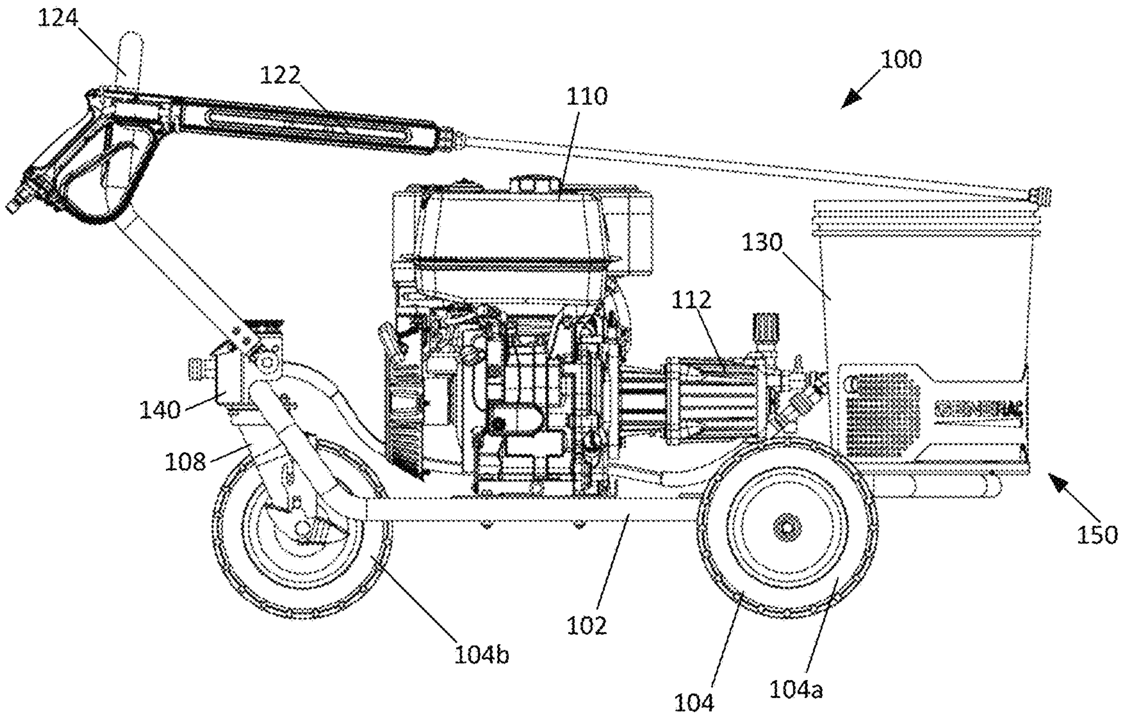
FIG. 3 is a first side view of the mobile pressure washer shown in FIG. 1.
Figure 4:
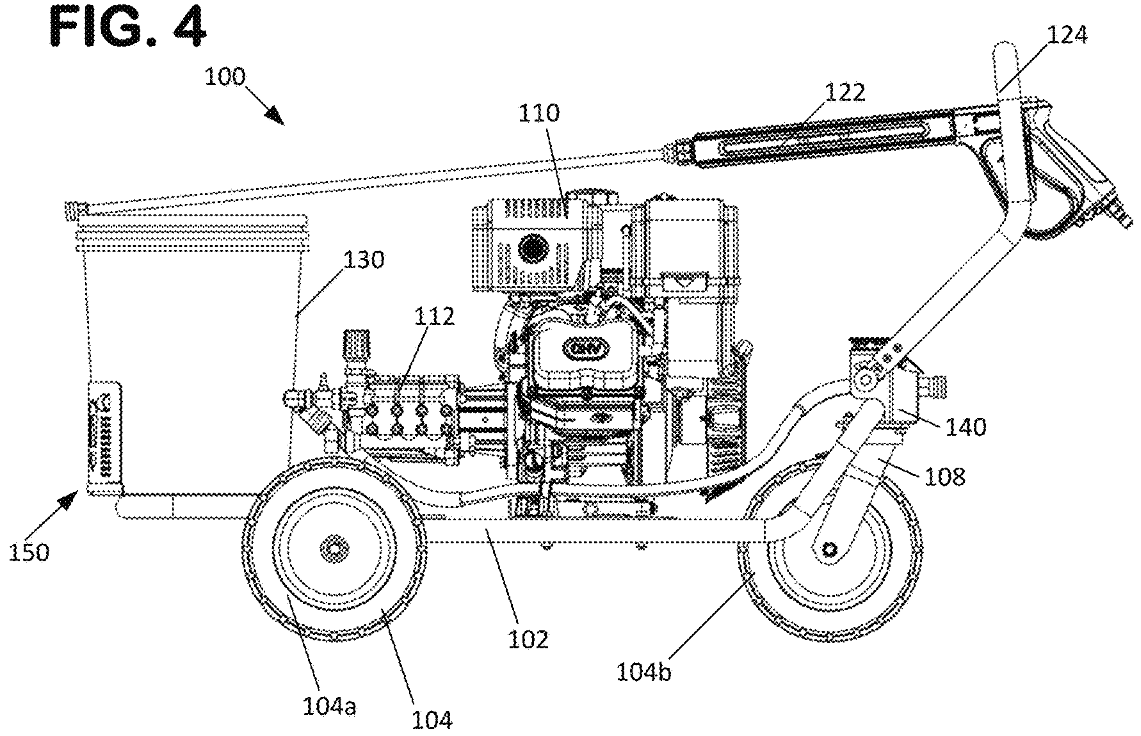
FIG. 4 is a second side view of the mobile pressure washer shown in FIG. 1.
Figure 5:
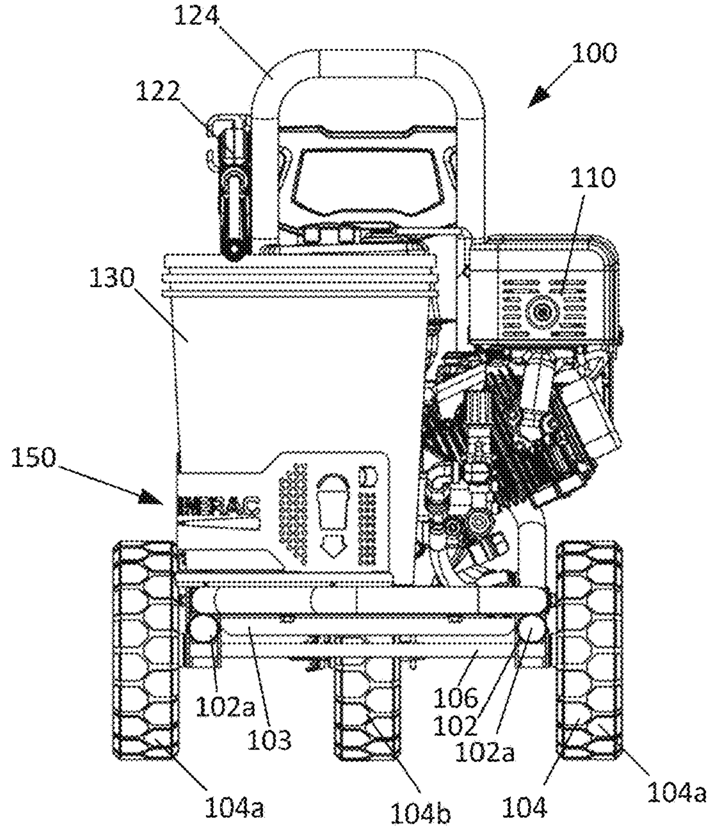
FIG. 5 is a rear view of the mobile pressure washer shown in FIG. 1.
Figure 6:
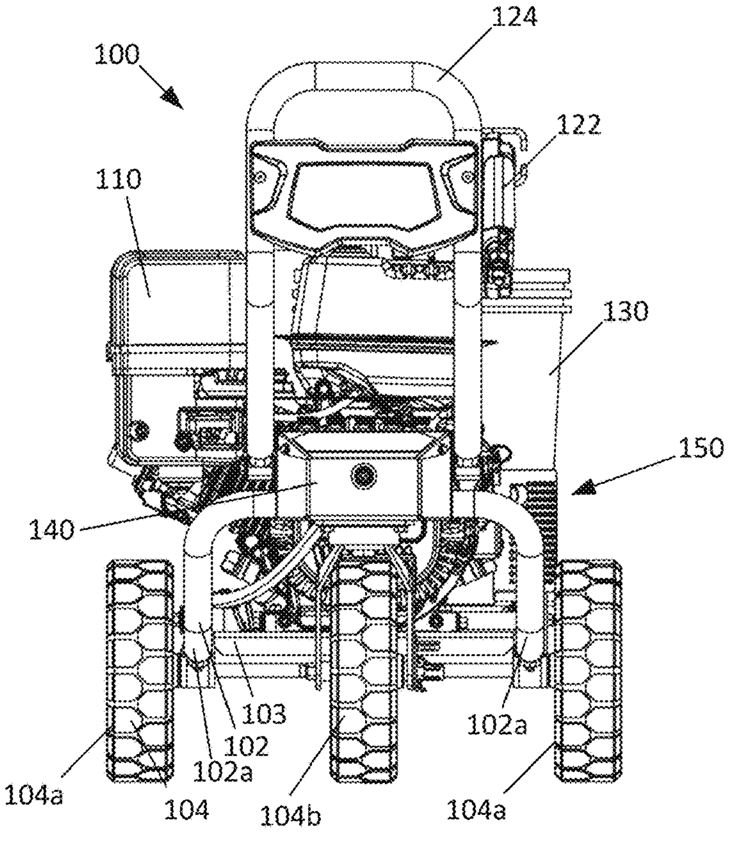
FIG. 6 is a front view of the mobile pressure washer shown in FIG. 1.
Figure 7:
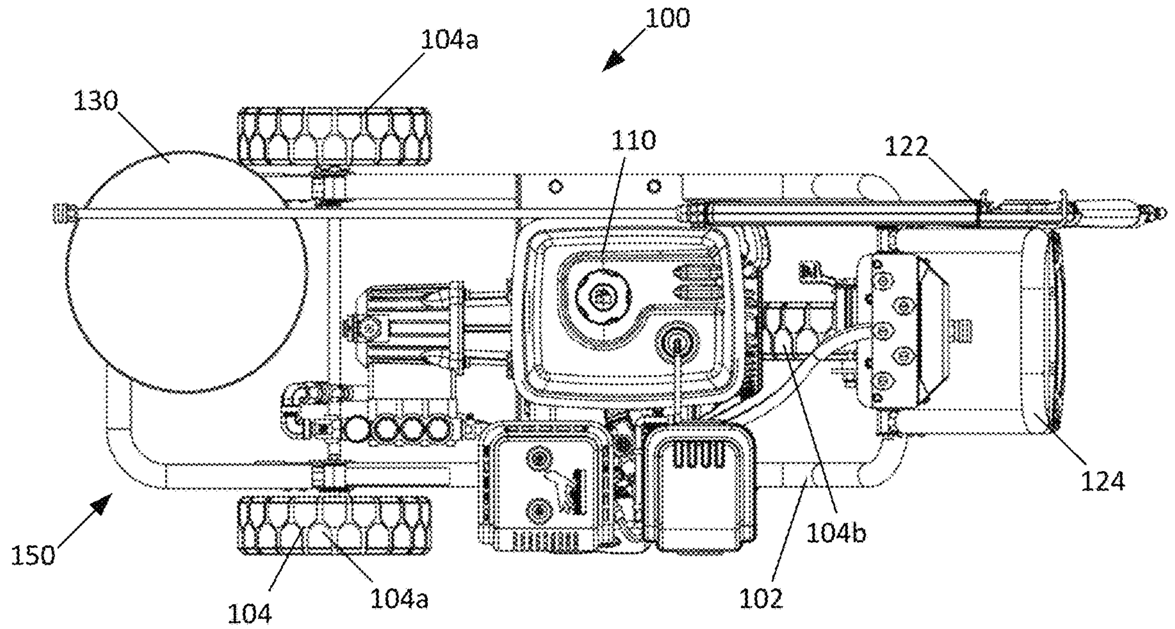
FIG. 7 is a top view of the mobile pressure washer shown in FIG. 1.
Figure 8:
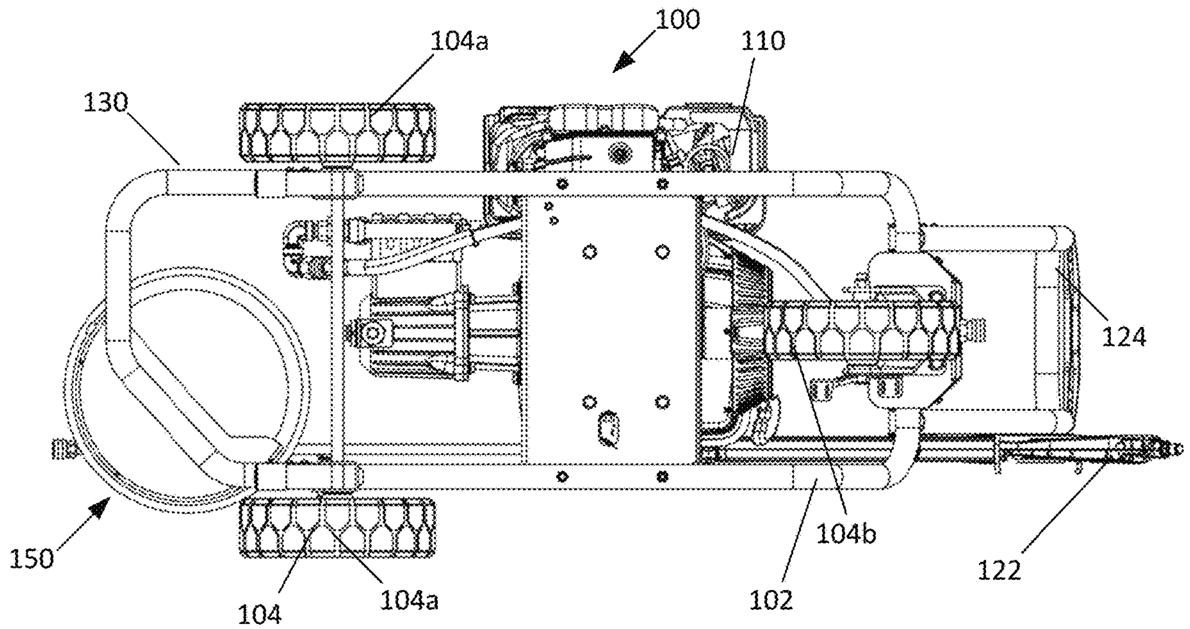
FIG. 8 is a bottom view of the mobile pressure washer shown in FIG. 1.
Figure 9:
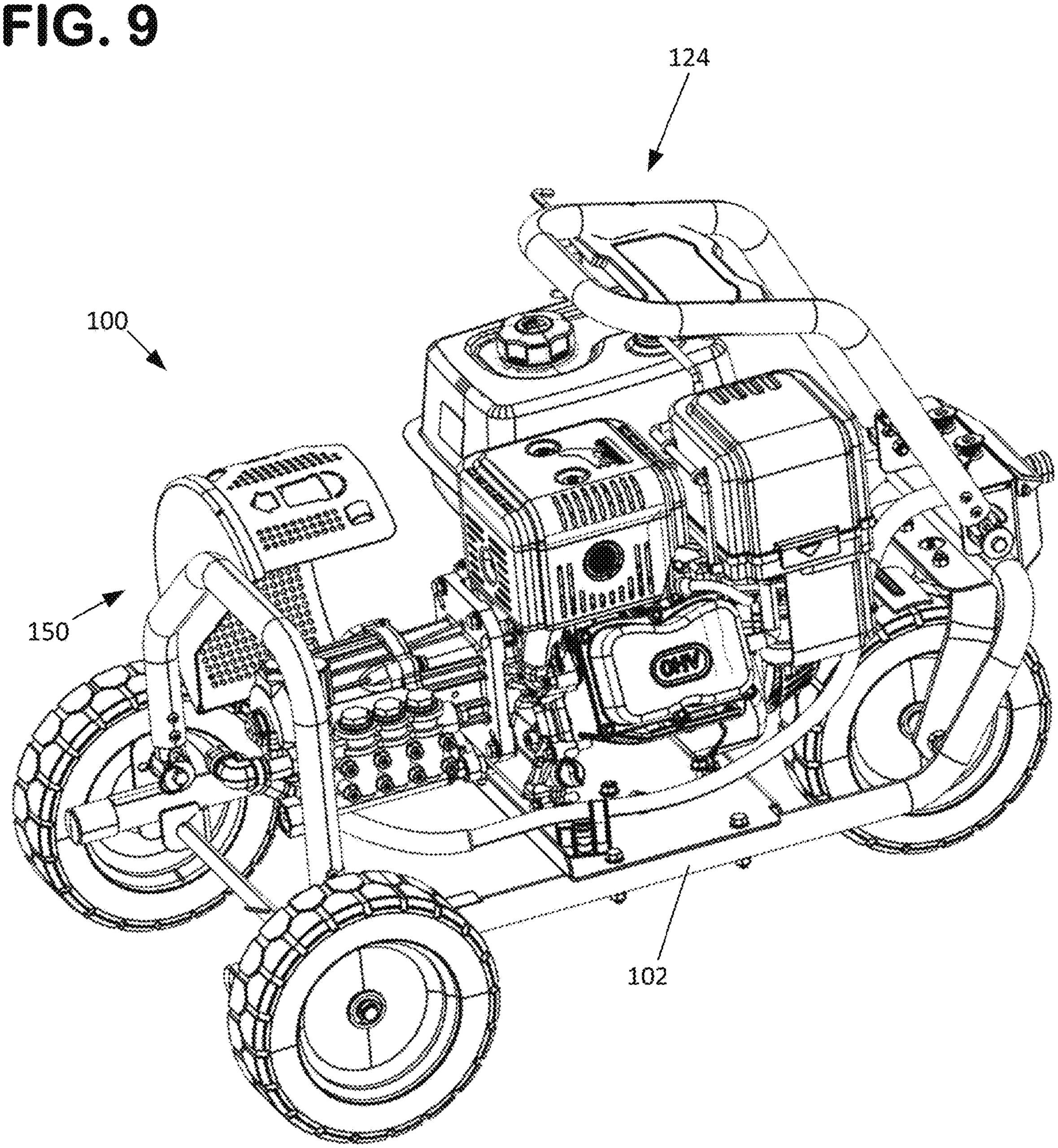
FIG. 9 is a perspective view of the mobile pressure washer shown in FIG. 1, with the container holder positioned in a storage position and with a handle assembly positioned in a storage position.
Figure 10:
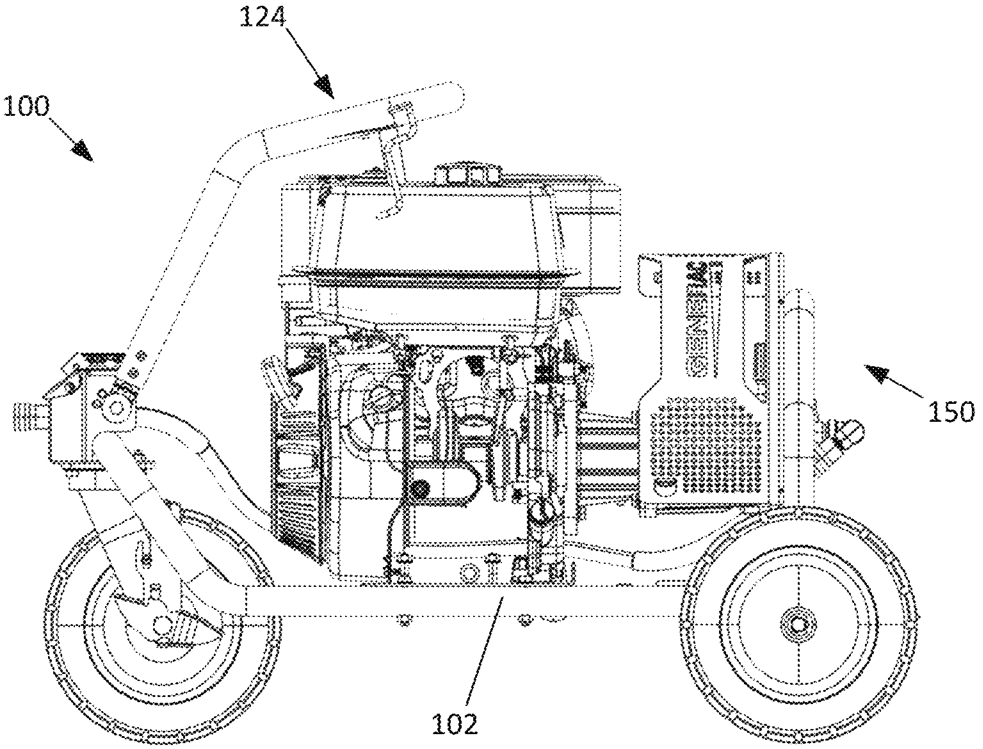
FIG. 10 is a first side view of the mobile pressure washer shown in FIG. 9.
Figure 11:
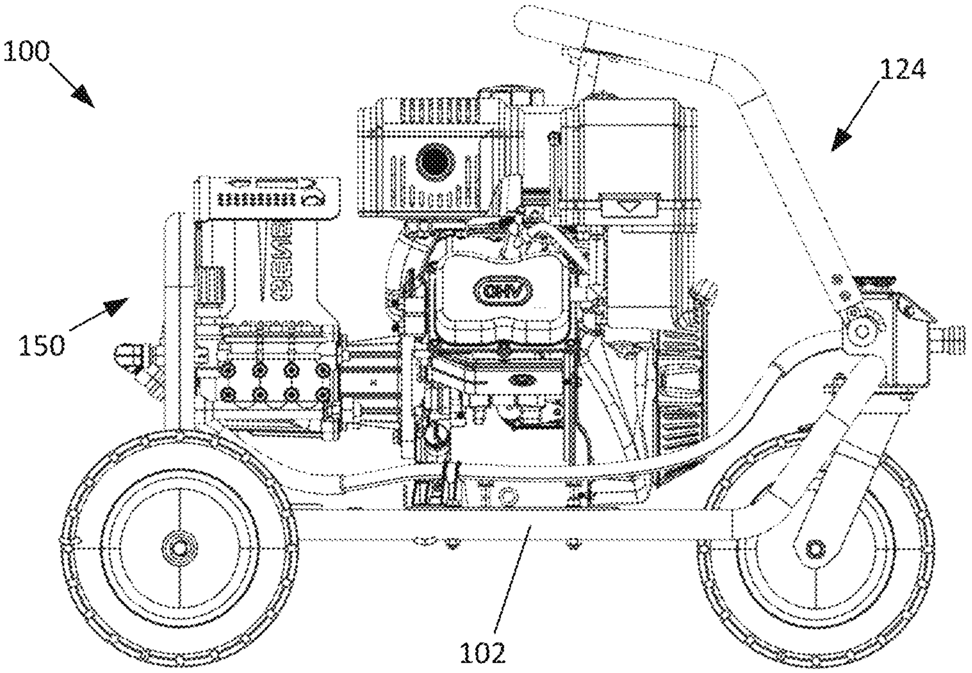
FIG. 11 is a second side view of the mobile pressure washer shown in FIG. 9.
Figure 12:
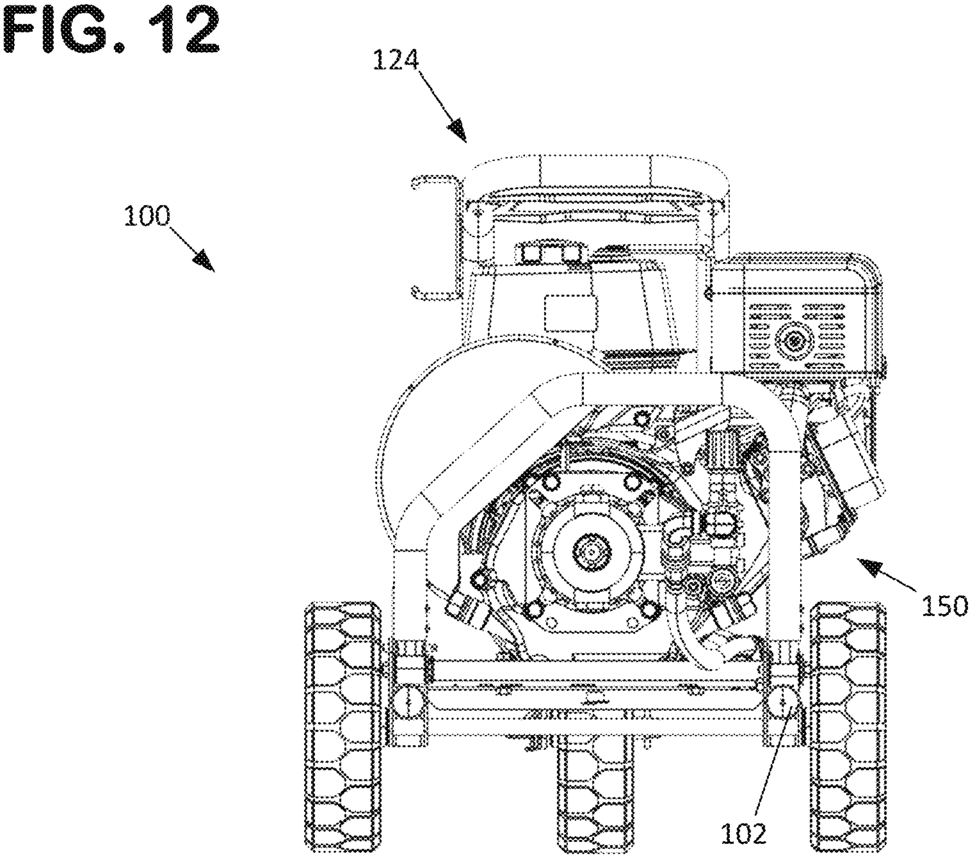
FIG. 12 is a rear view of the mobile pressure washer shown in FIG. 9.
Figure 13:
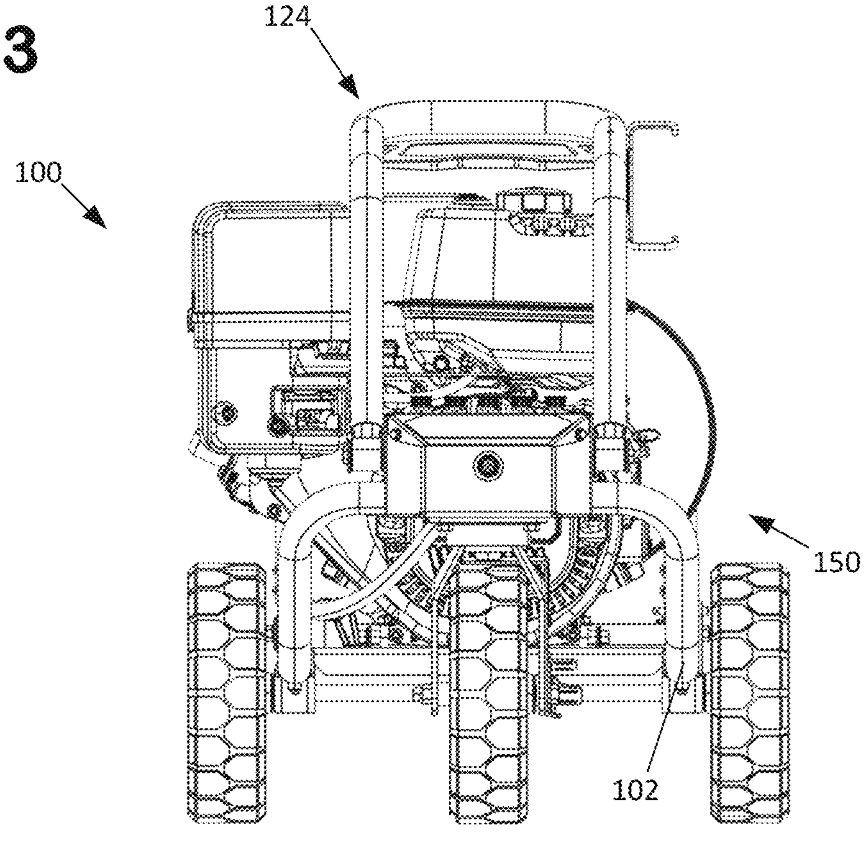
FIG. 13 is a front view of the mobile pressure washer shown in FIG. 9.
Figure 14:
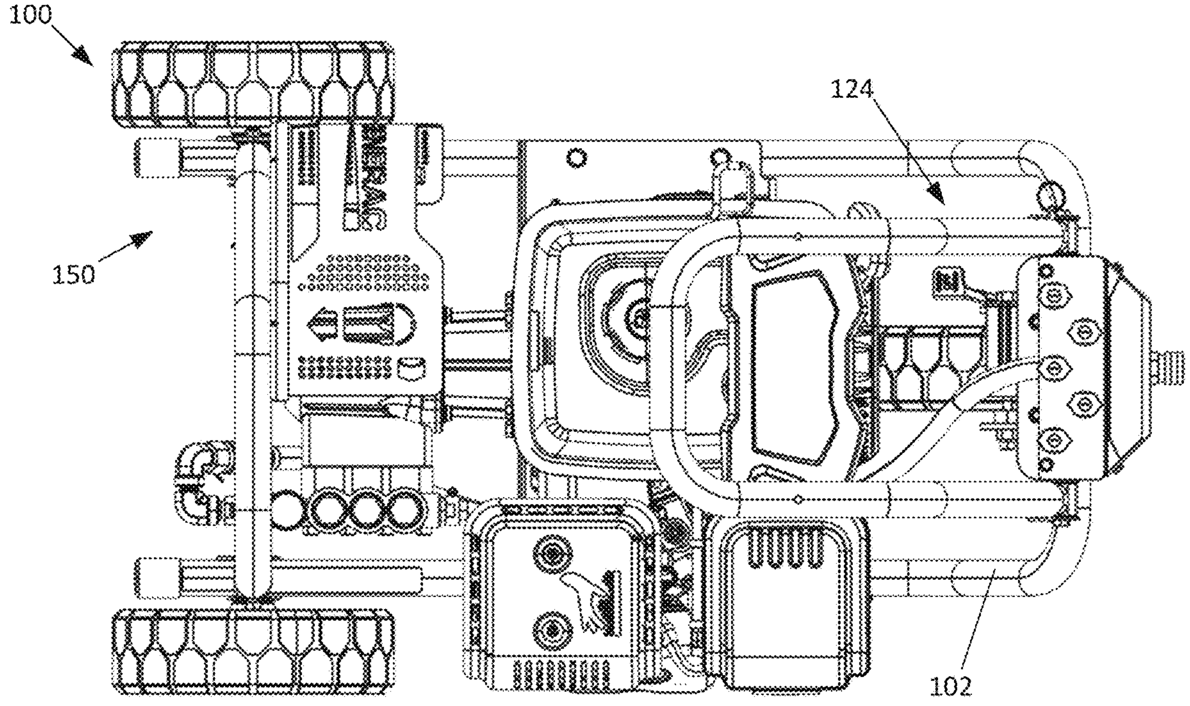
FIG. 14 is a top view of the mobile pressure washer shown in FIG. 1.
Figure 15:
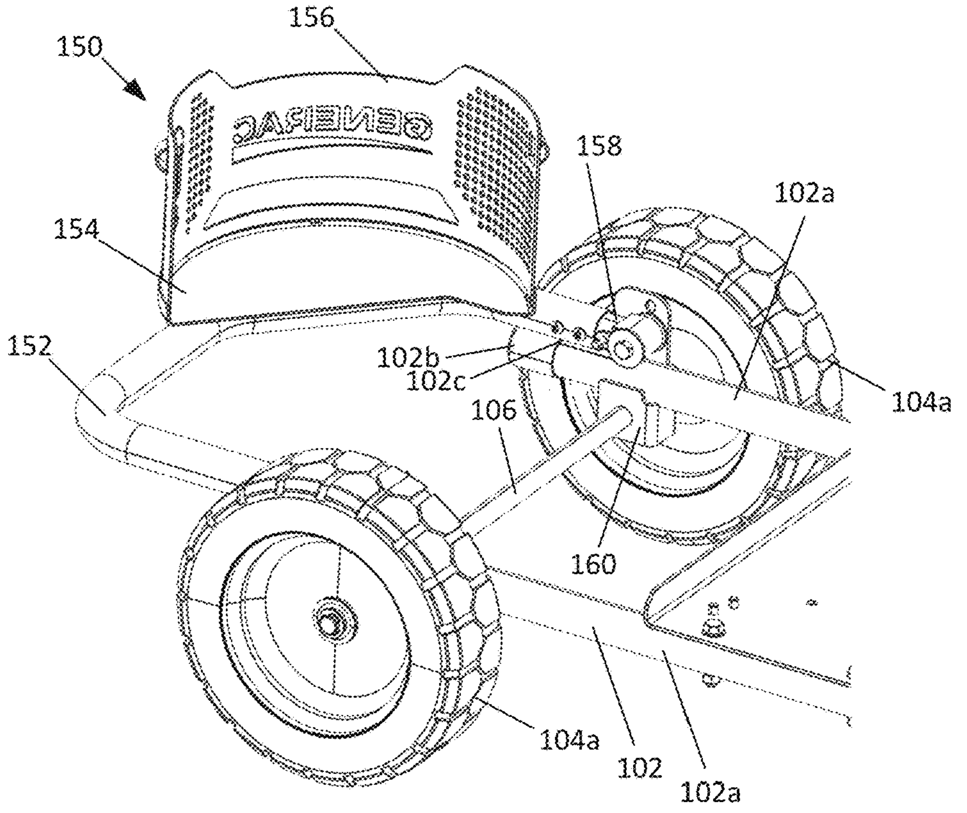
FIG. 15 is a perspective view of a portion of the of the mobile pressure washer shown in FIG. 1.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The present disclosure relates to a power equipment apparatus 100, such as a pressure washer 100. In some embodiments, the pressure washer 100 is a mobile pressure washer 100 including a wheeled chassis 102. The pressure washer 100 also includes a support assembly or container holder 150 for supporting a container 130 thereon. An example of a container 130 is a bucket 130, such as a chemical solution bucket. An example of a chemical solution bucket is a 5-gallon bucket, but other embodiments can involve containers having different sizes. The container or chemical solution bucket 130 stores a fluid 10 or chemical solution 10 within an interior volume 130*a* defined by the container or bucket 130. An example of a fluid 10 or chemical solution 10 is a cleaning detergent.

FIGS. 1 to 14 show views of the complete mobile pressure washer 100. FIGS. 1 to 8 show the mobile pressure washer 100 with the container holder 150 positioned in an extended position and supporting the container 130. FIGS. 9 to 14 show the mobile pressure washer 100 with the container 130 removed and the container holder 150 positioned in a storage position. The mobile pressure washer 100 is also shown as including a handle assembly 124 which is shown in an extended position at FIGS. 1 to 8 and in a storage position at FIGS. 9 to 14. In the extended position of the container holder 150, the container holder 150 extends beyond the wheeled chassis 102 and can receive and support the container 130. FIGS. 15-18 and 21-22 show portions of the mobile pressure washer 100 with the container holder 150 positioned in the extended position, but without the container 130 installed. FIGS. 31 to 34 show the aspects of the handle assembly 124. In the retracted or storage position of the container holder 150, the container holder 150 is rotated such that the container holder 150 is above the wheeled chassis 102 and, in the example shown, does not extend beyond the front of the wheeled chassis 102. Similarly, in the extended position of the handle assembly 124, the handle assembly 124 extends beyond the wheeled chassis 102 while in the storage position, the handle assembly 124 does not extend beyond the rear of the wheeled chassis 102. Accordingly, in the retracted or storage positions, the container holder 150 and handle assembly 124 do not increase the overall length of the mobile pressure washer 100 such that the mobile pressure washer 100 can be maneuvered more easily and stored within a space having a smaller overall footprint.

With continued reference to FIGS. 1 to 14, the mobile pressure washer 100 is shown as having a wheeled chassis 102 with three or more (e.g., 4, 5, 6, 7, etc.) wheels 104. In another possible embodiment, the mobile pressure washer 100 includes two or more wheels 104. In the example shown, the mobile pressure washer 100 includes a pair of rear wheels 104*a* supported by a common axle 106 and a front wheel 104*b* supported by a rotatable carrier 108. The rotatable carrier 108 allows for steering of the mobile pressure washer 100 via the rear wheel 104*a*. Many other configurations for the wheels 104 are possible without departing from the concepts presented herein.

With continued reference to FIGS. 1 to 14, the mobile pressure washer 100 is also shown as including a power plant 110, such as an internal combustion engine or electric motor which may be battery powered or provided with an electrical cord. In one aspect, the power plant 110 is supported by a support plate 103 which is in turn supported by parallel tubes 102*a* of the wheeled chassis 102. The mobile pressure washer 100 is also shown as including a fluid pump 112 driven by the power plant 110, and a manifold 114 in fluid communication with the fluid pump 112. In one aspect, the manifold 114 includes a first inlet port 114*a* configured for connection with a supply water source 116, such as a garden hose 116. The manifold 114 is also shown as including a second inlet port 114*b* which can be configured, for example, as a chemical solution inlet port 114*b*. The inlet port 114*b* is configured for connection with a supply chemical solution source 118, such as a chemical solution tube 118. As shown, the chemical solution tube 118 extends into the container 130 such that chemical solution stored in the container 130 can be delivered to the chemical solution inlet port 114*b* via the operation of the pump 112 using one or more of suction, siphoning, and aspiration. In some arrangements, the chemical solution tube 118 can be connected to another port along a flow path from the container 130 to the manifold 114.

Figure 49:
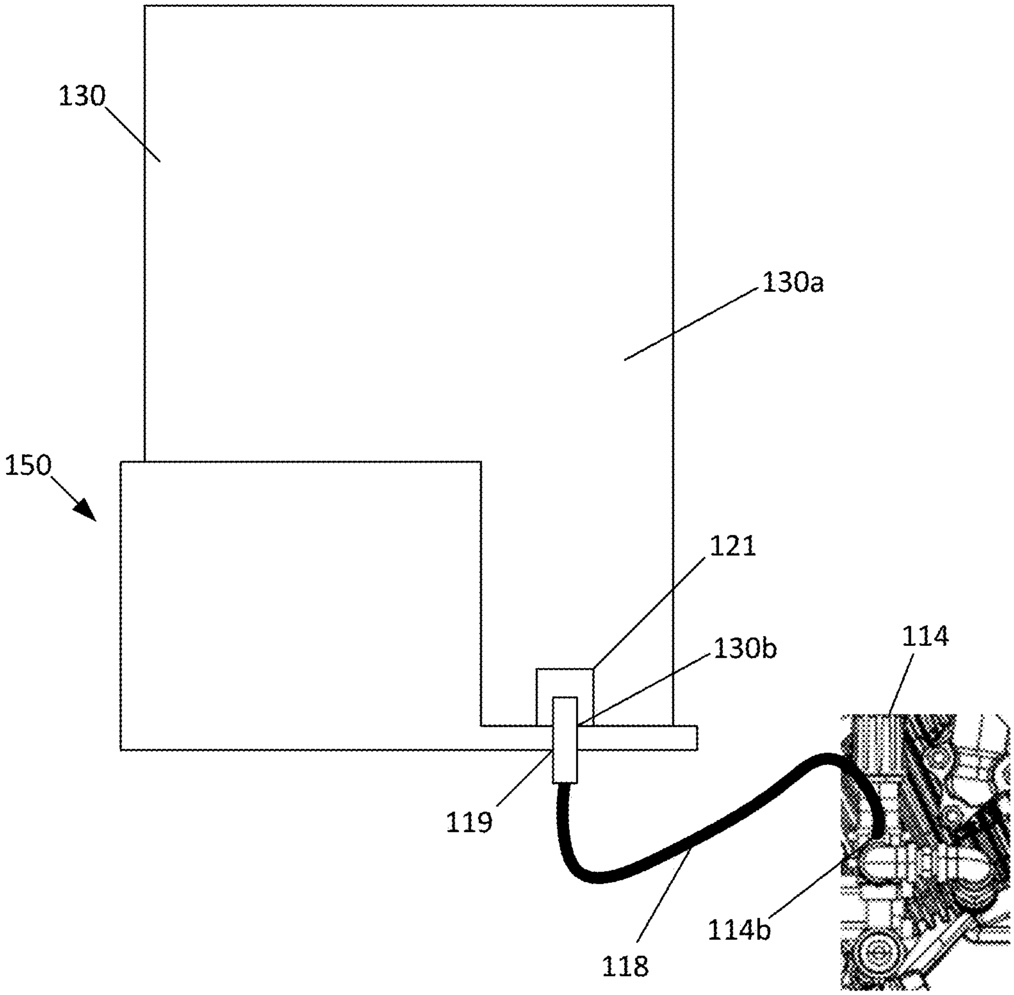
FIG. 49 is a schematic view of an alternative chemical feed arrangement usable with either of the pressure washer designs shown at FIGS. 1 and 35.

In some arrangements, the chemical solution tube 118 can be hard piped to the container holder 150 and the manifold 114, as illustrated schematically at FIG. 49. With such a configuration, the container 130 can be provided with a port 130*b* that accepts the end of the chemical solution tube 118 or a fitting 119 attached to the end of the chemical solution tube 118 when the container 130 is installed on the container holder 150. In such a configuration, the container 130 can be provided with a valve 121 at the port 130*b* that is actuated by the fitting 119 such that the valve 121 closes when the container 130 is removed from the container holder 150 and such that the valve 121 opens when the container 130 is installed onto the fitting 119 and container holder 150.

In one aspect, the manifold 114 is adapted and arranged to mix supply water from the supply source 116 with the chemical solution from the container 130. The manifold 114 is further shown with a supply outlet port 114*c* for delivering the pressurized, mixed fluid. In operation, fluid flows through the manifold 114 which includes a Venturi. When the use of chemical solution is desired, an appropriate nozzle is installed to reduce the pressure and increases the flow. The increased flow across the Venturi creates a pressure drop which creates a vacuum which draws in the chemical out of the container and into the manifold 114, where it mixed with water and ultimately discharged through the spray nozzle by operation of the pump 112. When chemical is not required, a different nozzle can be installed which has low flow and higher pressure, wherein the absence of a pressure drop results in no vacuum being created to draw chemical solution out of the container 130.

With continued reference to FIGS. 1 to 14, the manifold 114 is shown as including a supply outlet port 114*c* configured for connection with a hose 120 which is in turn connected to a sprayer or wand 122 of the mobile pressure washer 100. In the example shown, the hose 120 includes a first hose 120*a* routed to a coupler 120*c* and a second hose 120*b* extending between the coupler 120*c* and the sprayer or wand 122. The coupler 120*c* can include a quick-disconnect type coupler or a threaded fitting. In one aspect, the pump 112, manifold 114, container 130, hoses 116, 118, 120 (120*a*, 120*b*), coupler 120*c* and sprayer 122 can all be characterized as being in fluid communication with each other. In some configurations, for example the disclosed configuration, an unloader valve 126 can be provided at the manifold 114 for pressure adjustment through the manifold 114 and sprayer 122.

With continued reference to FIGS. 1 to 14, the mobile pressure washer 100 can include a panel 140 for housing the coupler 120*c* and for storing additional nozzles usable with the sprayer or wand 122. In one aspect, the sprayer or wand 122 typically includes a trigger-controlled valve that sprays the water and chemical solution mixture when the trigger is activated by an operator. In the example shown, the sprayer or wand 122 is supported by a foldable arm or handle 124 pivotably or fixedly mounted to the wheeled chassis 102. Other power plant, pump, manifold, and sprayer configurations are possible without departing from the concepts presented herein.

Figure 19:
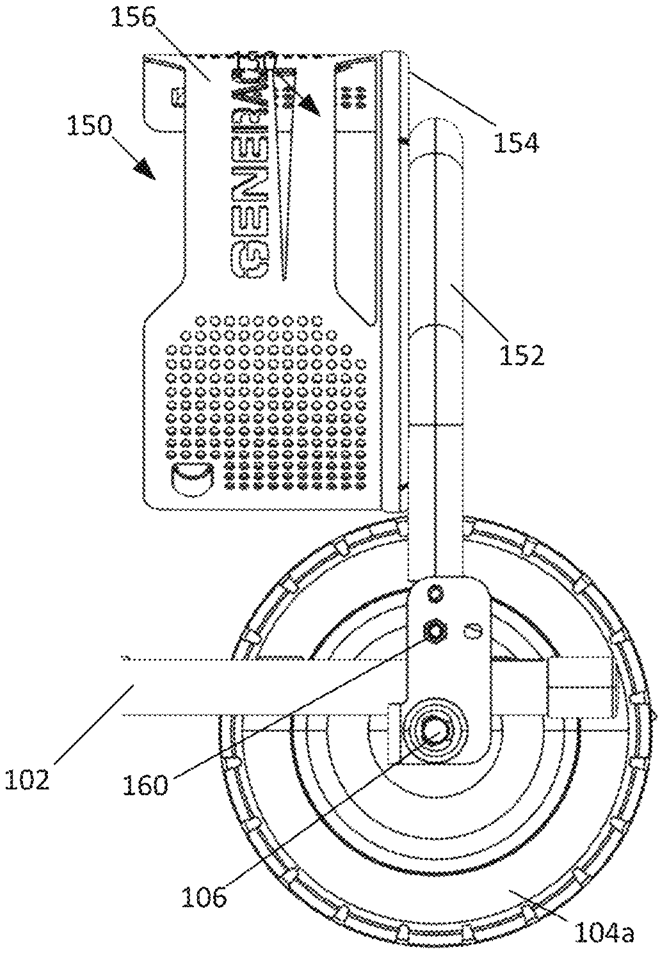
FIG. 19 is a side view of a portion of the of the mobile pressure washer shown in FIG. 1, with the container holder in the storage position.
Figure 20:
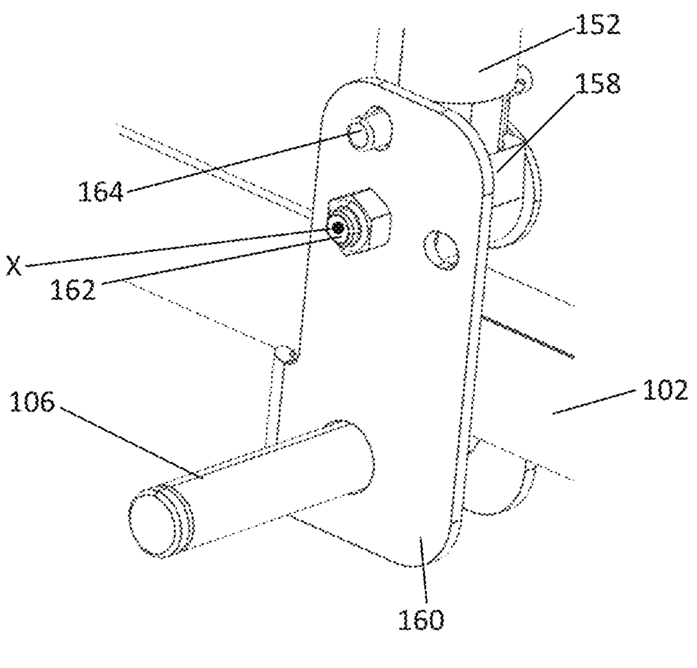
FIG. 20 is an enlarged perspective view of the mobile pressure washer shown in FIG. 19.
Figure 21:
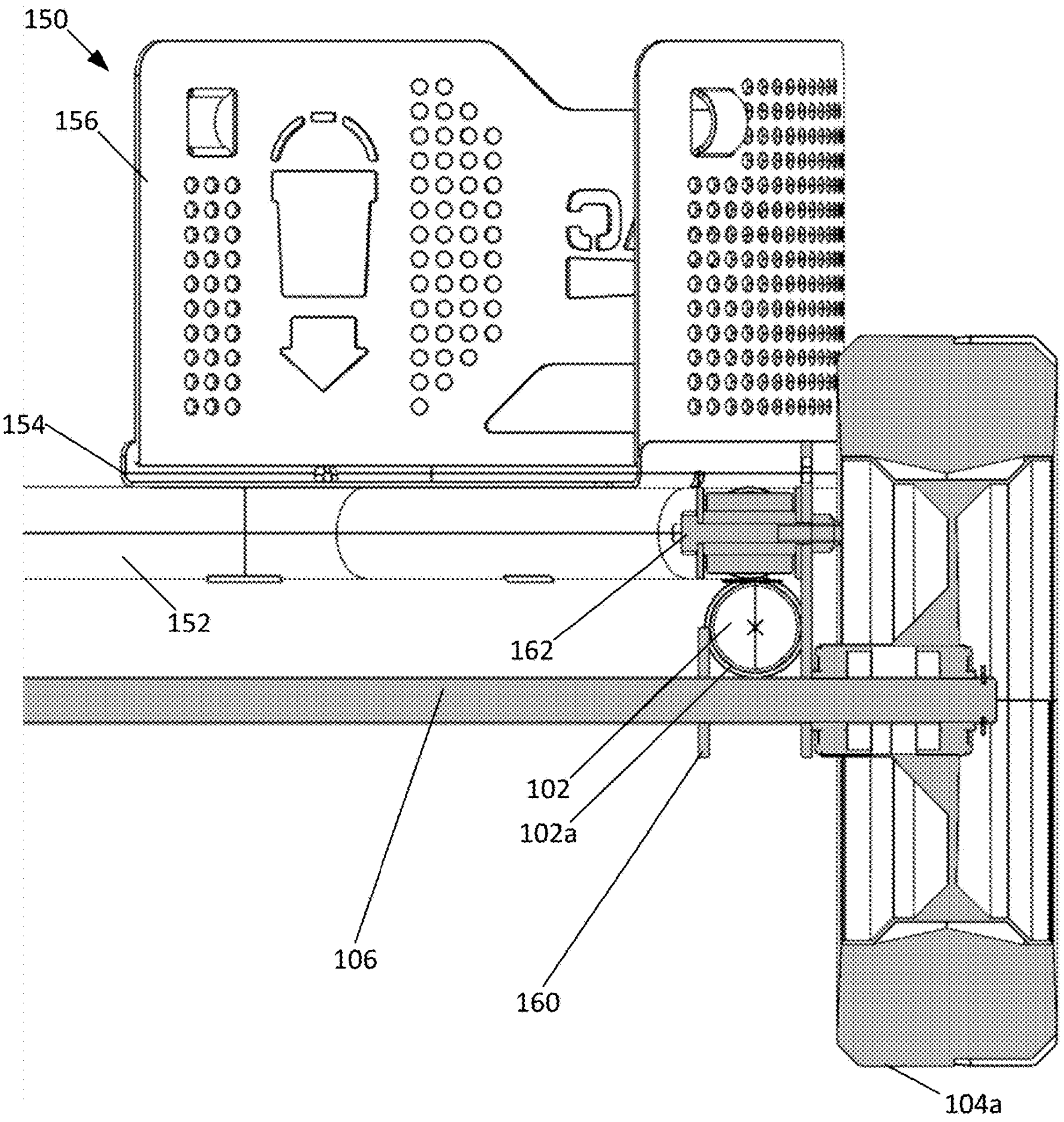
FIG. 21 is a partial cross-sectional side view of the mobile pressure washer shown in FIG. 1, with the container holder in the extended position.
Figure 22:
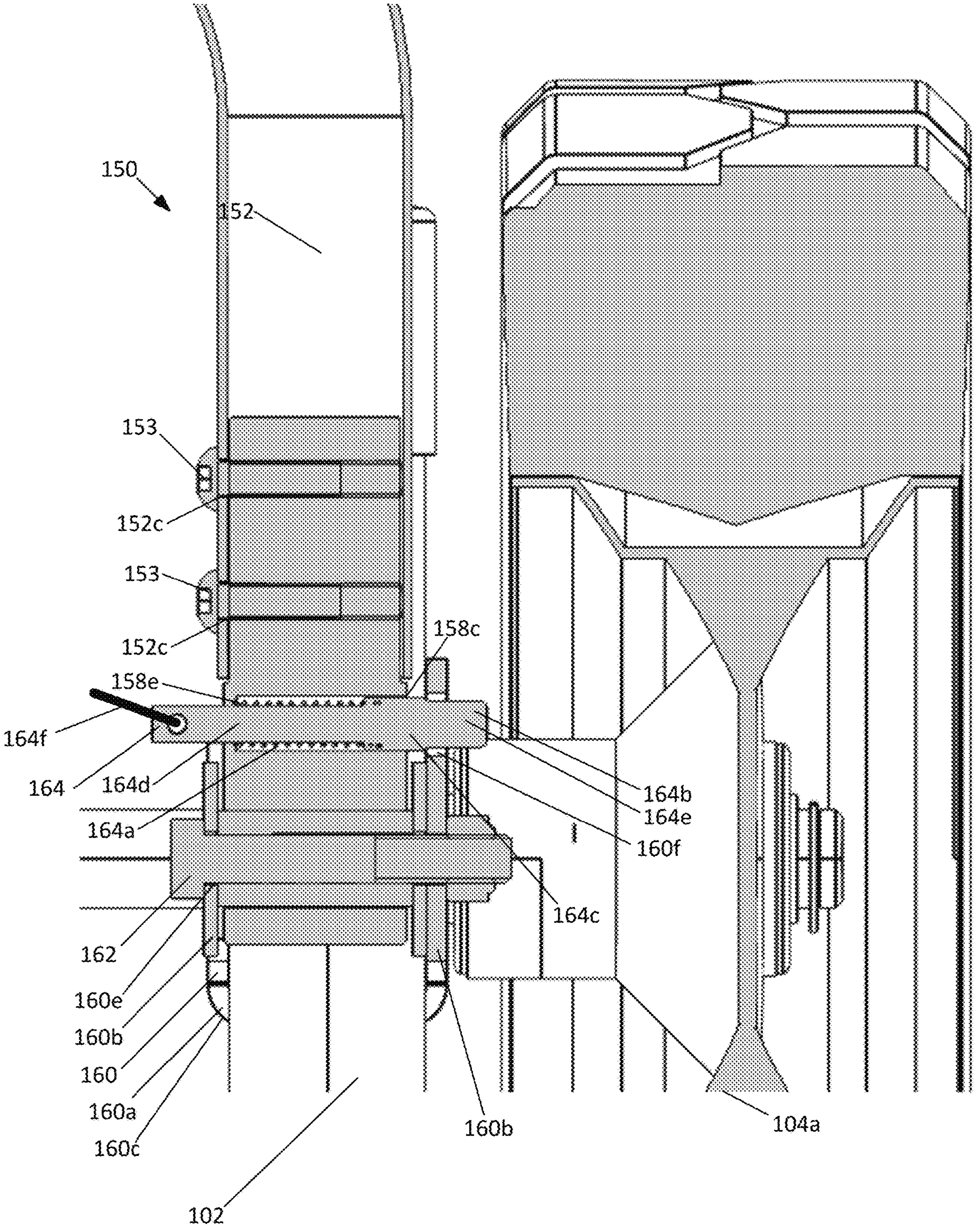
FIG. 22 is a partial cross-sectional side view of the mobile pressure washer shown in FIG. 21, with the container holder in the extended position.
Figure 23:
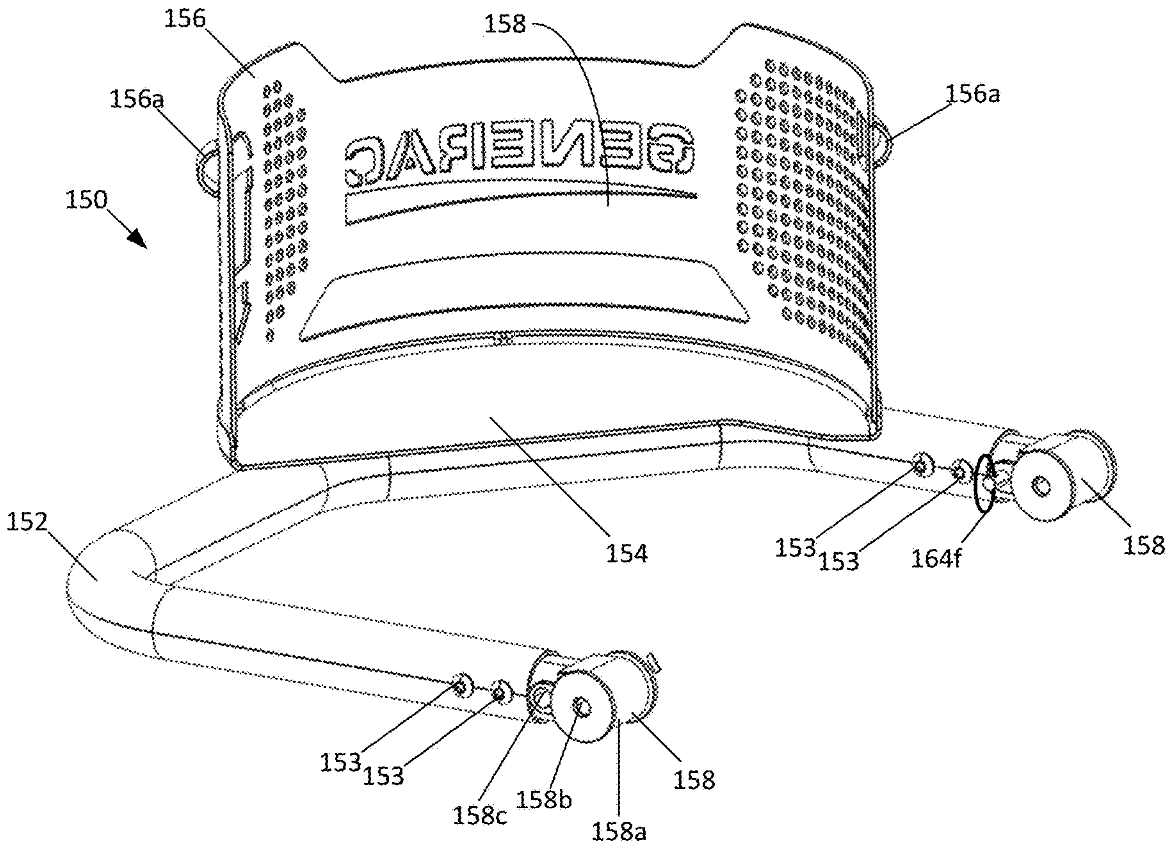
FIG. 23 is a perspective front view of the container holder of the pressure washer shown in FIG. 1.
Figure 24:
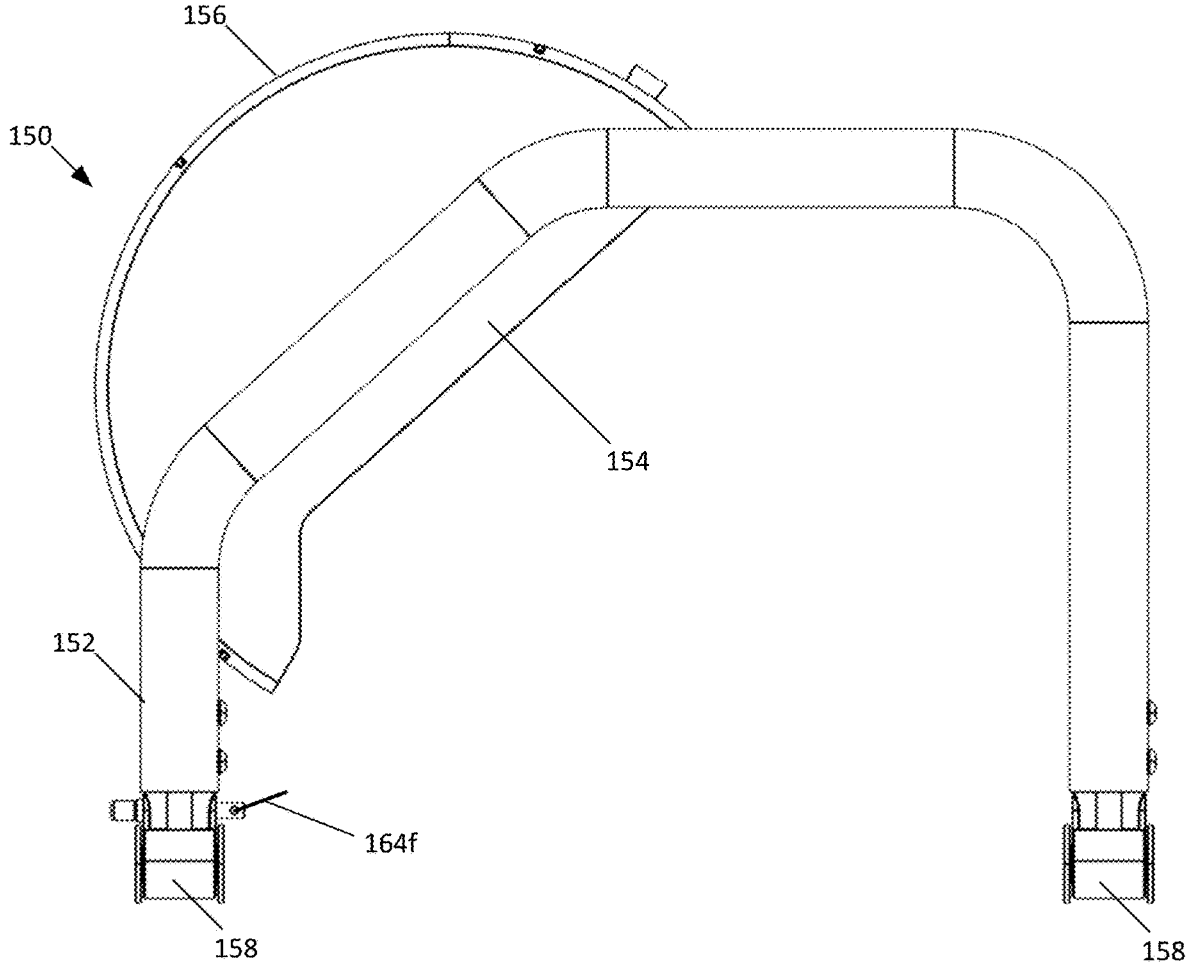
FIG. 24 is a bottom view of the container holder shown in FIG. 42.
Figure 25:
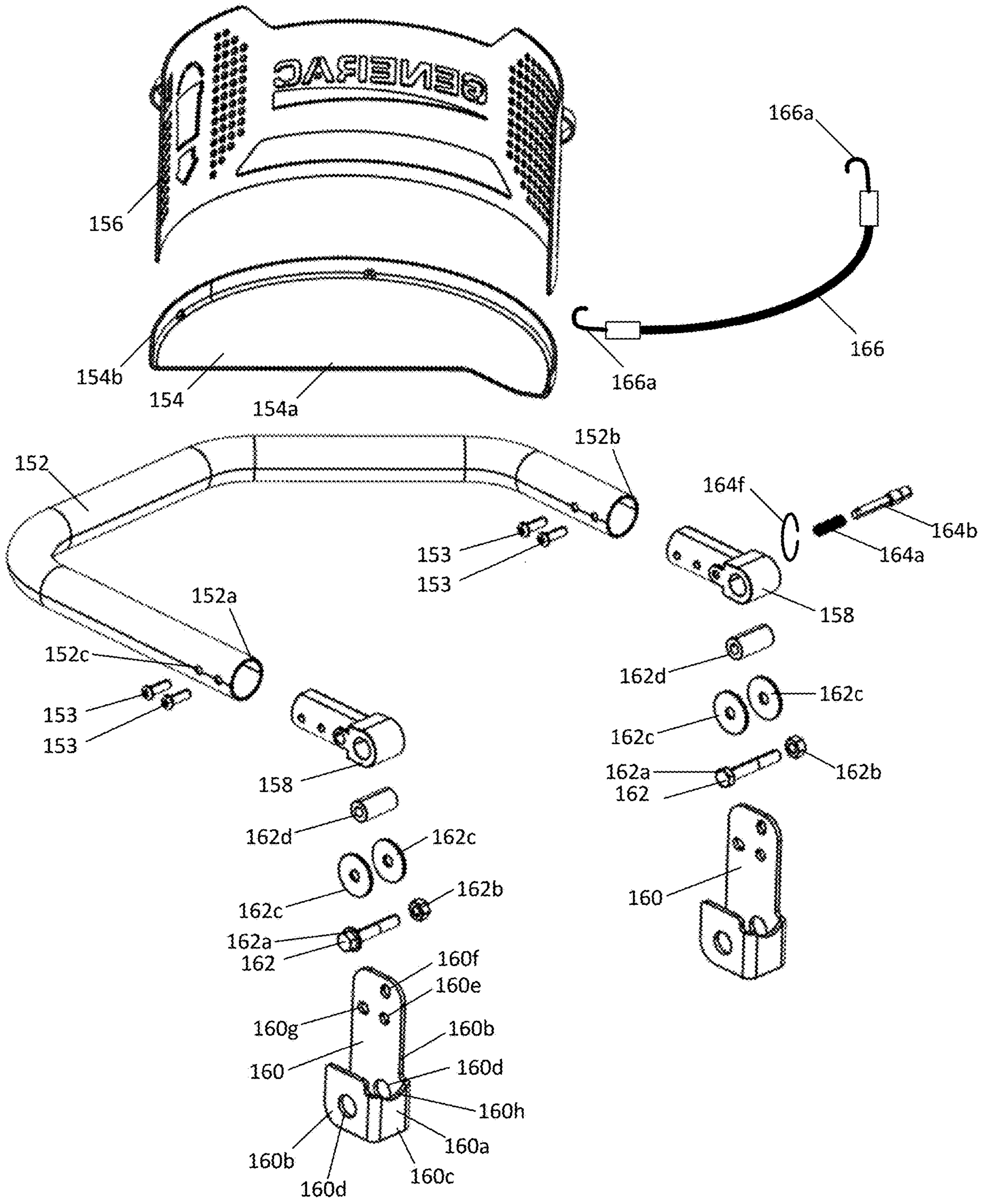
FIG. 25 is an exploded perspective view of the container holder and coupling arrangement of the pressure washer shown in FIG. 1.
Figure 26:
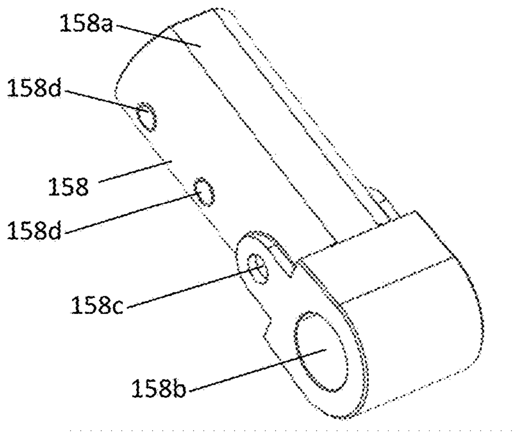
FIG. 26 is a first perspective view of a coupling member of the pressure washer shown in FIG. 1.
Figure 27:
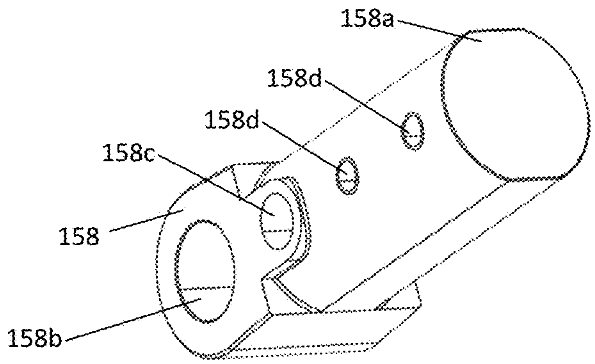
FIG. 27 is a second perspective view of the coupling member shown in FIG. 26.
Figure 28:
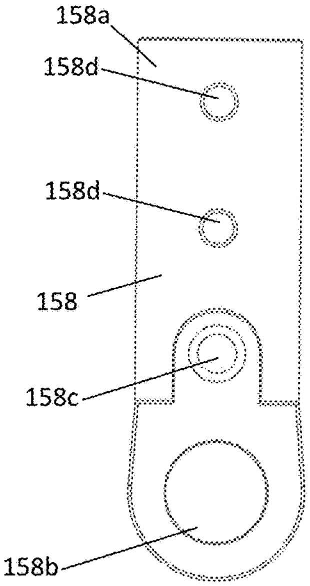
FIG. 28 is a side view of the coupling member shown in FIG. 26.
Figure 29:
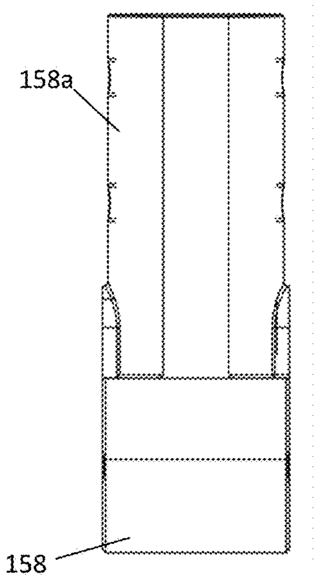
FIG. 29 is a top view of the coupling member shown in FIG. 26.
Figure 30:
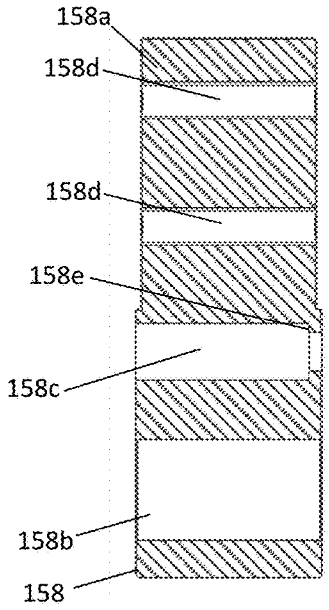
FIG. 30 is a cross-sectional top view of the coupling member shown in FIG. 26.
Figure 31:
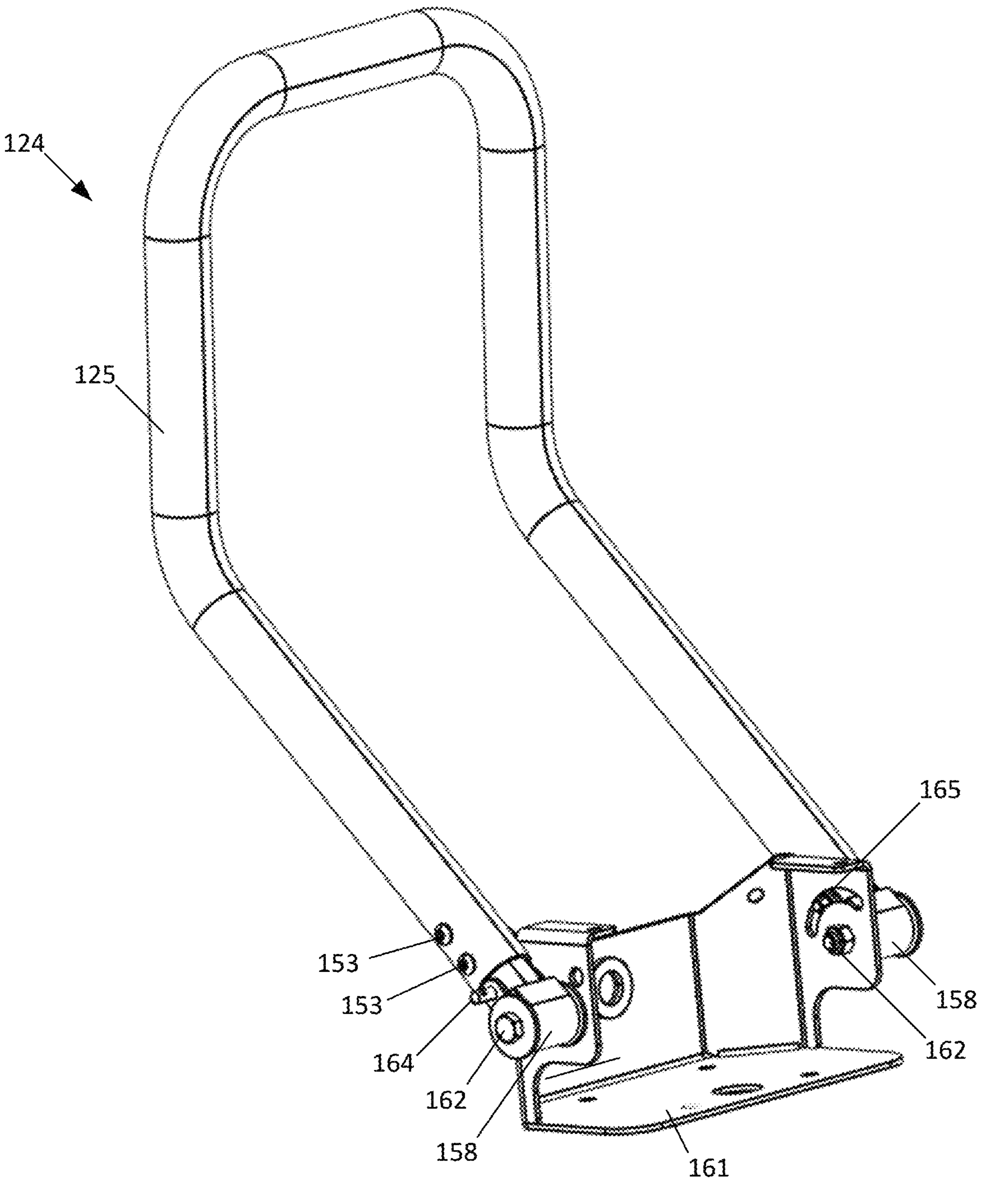
FIG. 31 is a perspective view of a handle assembly of the mobile pressure washer shown in FIG. 1.
Figure 32:
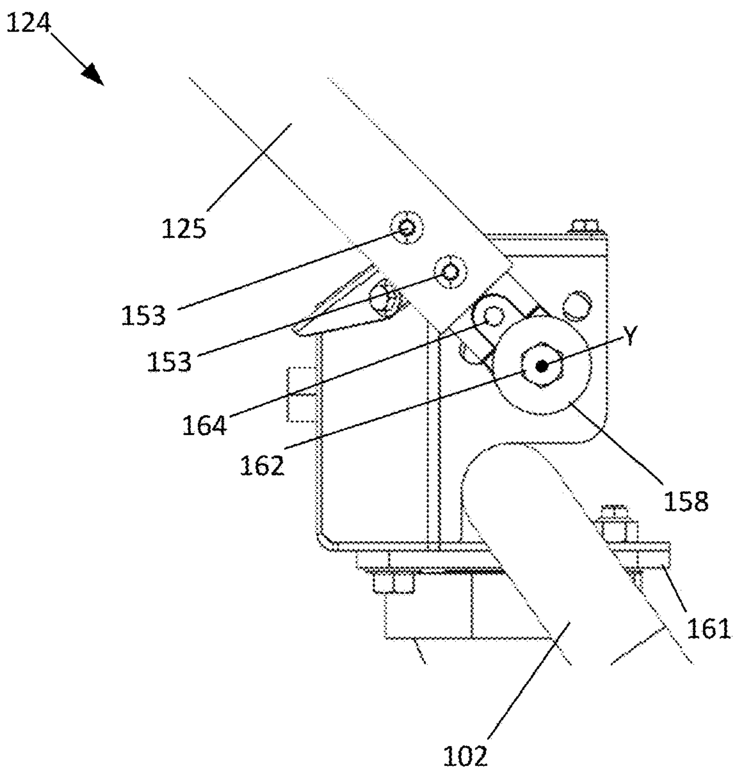
FIG. 32 is a side view of a portion of the handle assembly shown in FIG. 31, with the handle assembly shown in the extended position.
Figure 33:
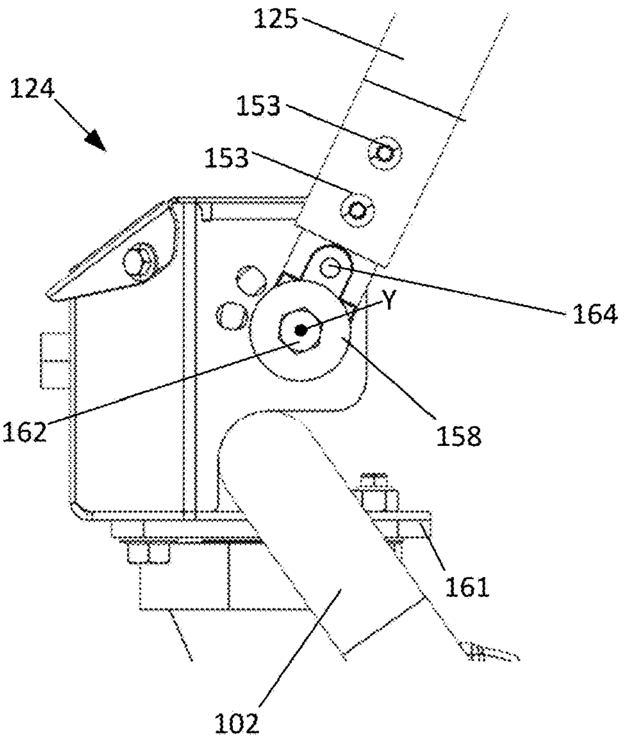
FIG. 33 is a side view of a portion of the handle assembly shown in FIG. 31, with the handle assembly shown in the storage position.
Figure 34:
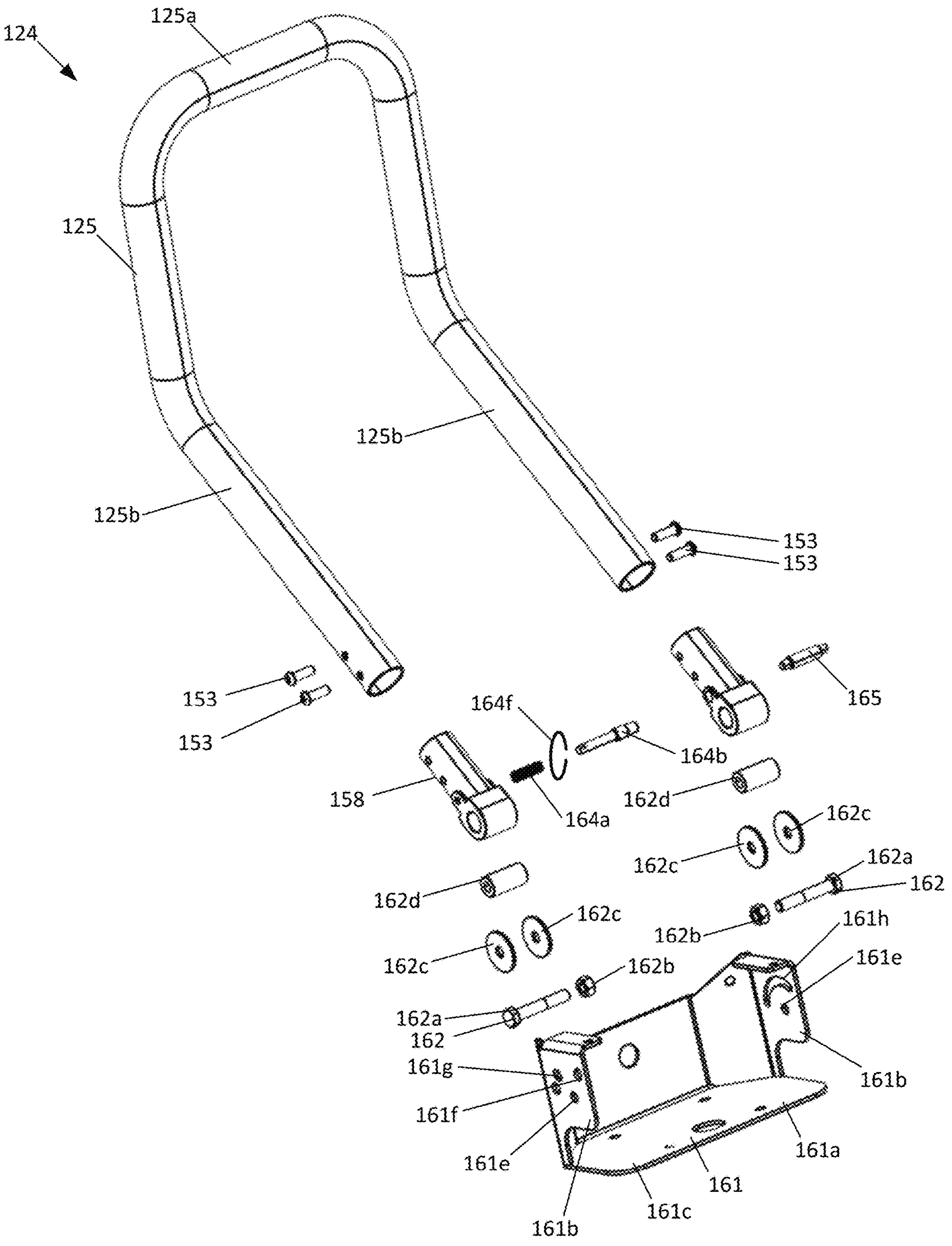
FIG. 34 is an exploded perspective view of the handle assembly shown in FIG. 31.
Figure 35:
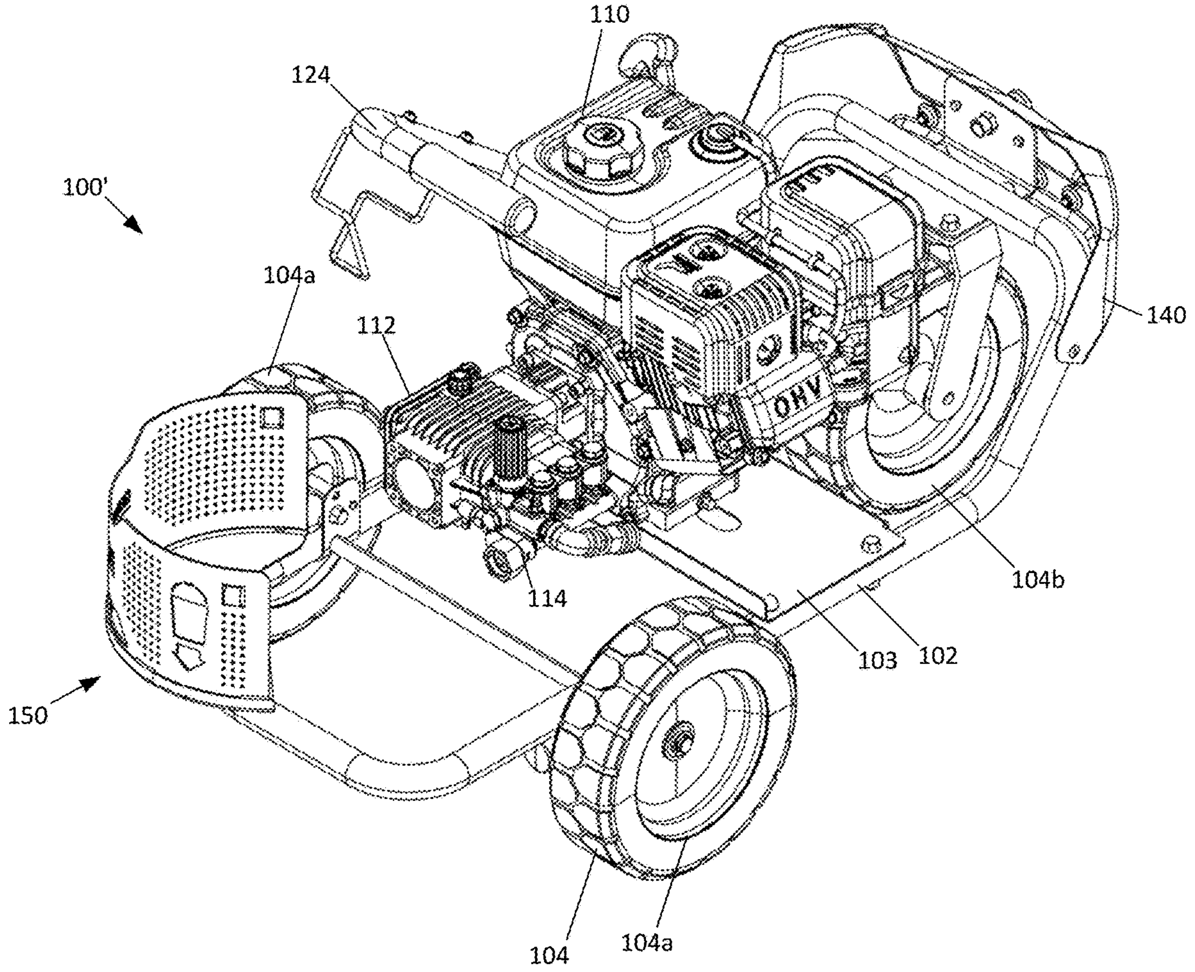
FIG. 35 is a perspective side view of a second example of a mobile pressure washer including a container holder positioned in an extended position.
Figure 36:
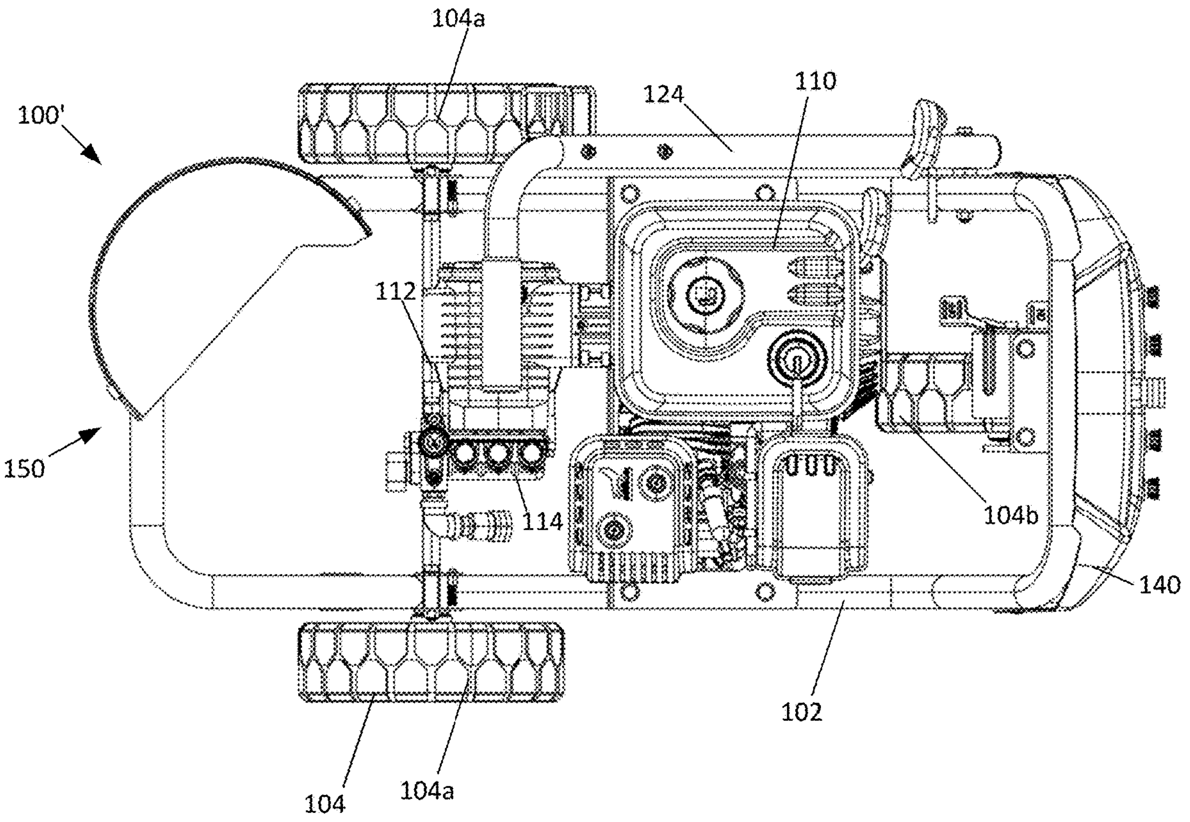
FIG. 36 is a top view of the mobile pressure washer of FIG. 35.
Figure 37:
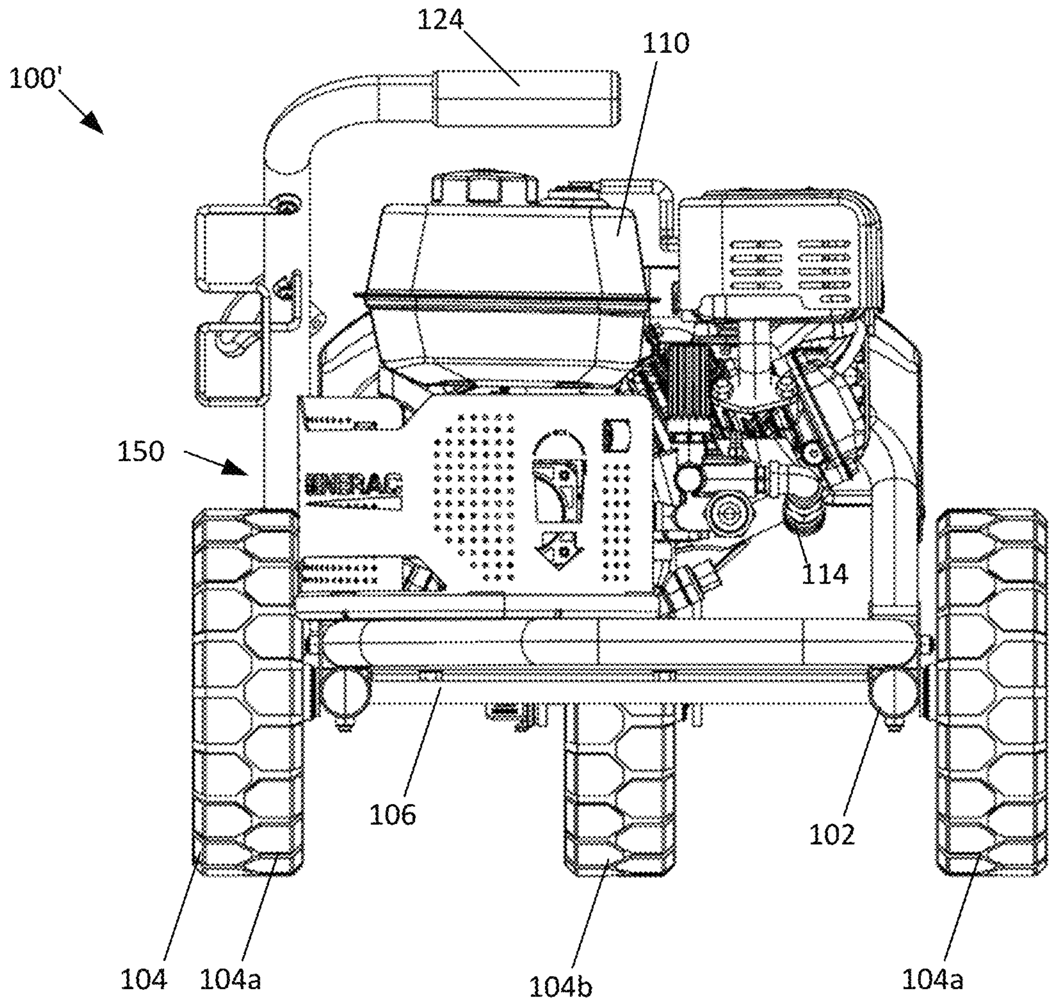
FIG. 37 is a rear view of the mobile pressure washer of FIG. 35.
Figure 38:
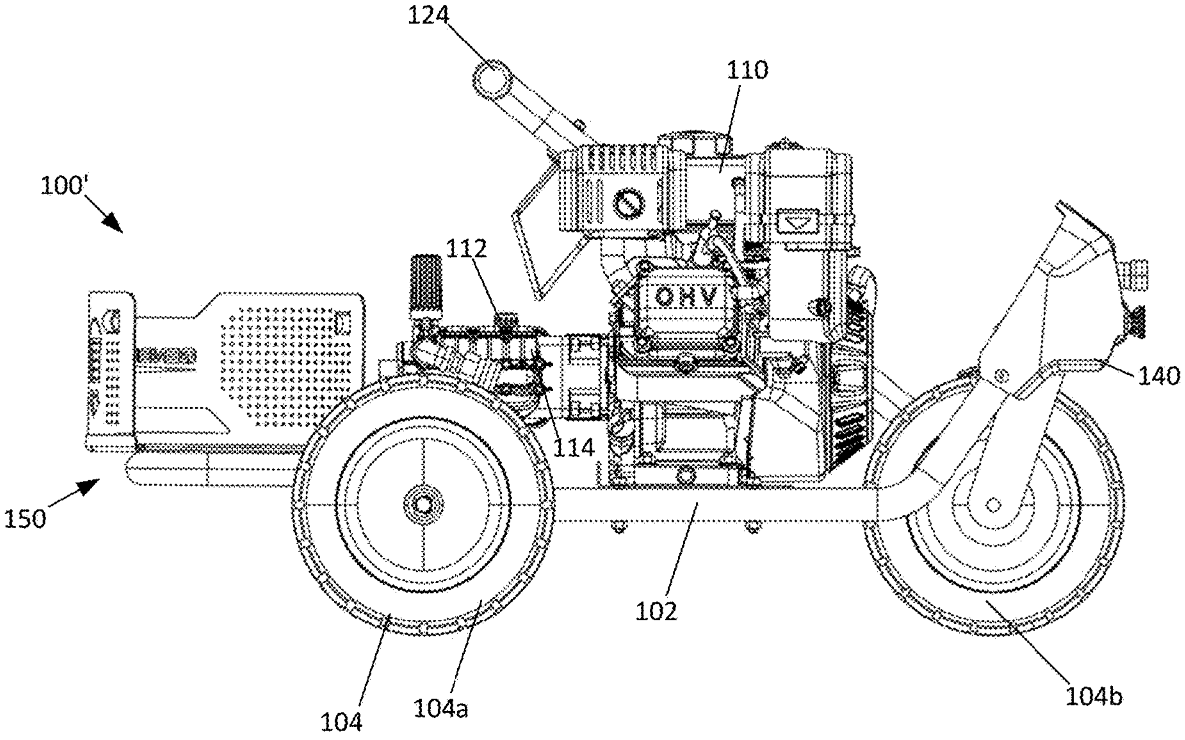
FIG. 38 is a side view of the mobile pressure washer of FIG. 35.
Figure 39:
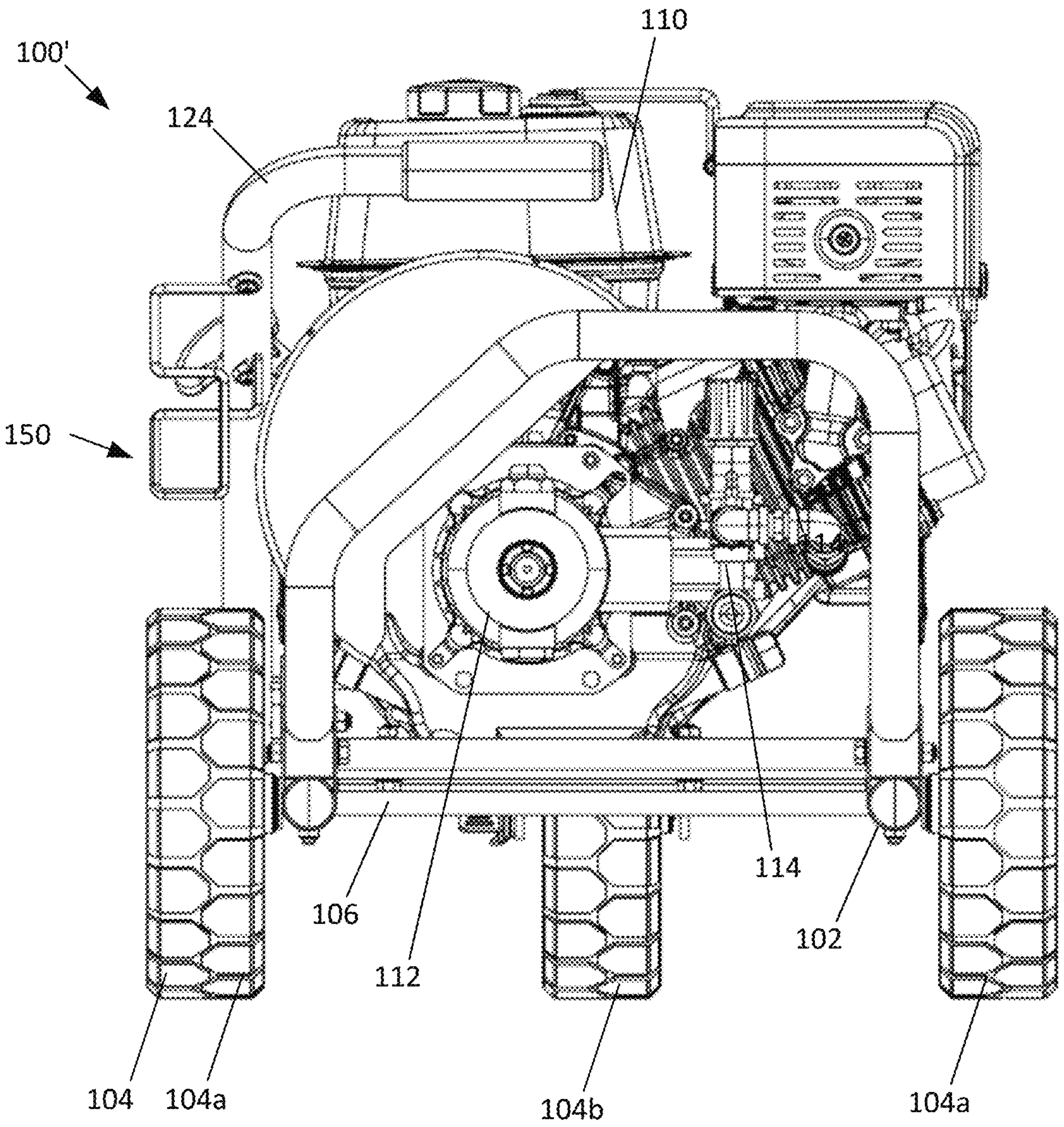
FIG. 39 is a rear view of the mobile pressure washer of FIG. 35, with the container holder positioned in a storage position.

With reference to FIGS. 15 to 31, aspects of the container holder 150 are shown in greater detail. FIGS. 15-18 and 21-22 show the container holder 150 in the extended position while FIGS. 19 and 20 show the container holder 150 in the retracted or storage position. FIGS. 21 and 22 show cross-sectional views of the container holder 150 while FIGS. 23 to 25 show the container holder 150 in isolation from the mobile pressure washer 100. FIG. 25 shows an exploded view of the container holder 150. FIGS. 26 to 30 show a coupling member 158 of the container holder 150. The coupling member 158 is also used with the handle assembly 124, as described in further detail later.

As most easily seen at FIG. 25, the container holder 150 can include a generally U-shaped tubular frame 152 extending between a first end 152*a* and a second end 152*b*, a base plate 154 secured to the frame 152, such as by welding, and a sidewall 156 extending from the base plate 154. In one aspect, the base plate 154 is provided with a base portion 154*a* and a lip portion 154*b*, wherein the lip portion 154*b* supports and overlaps with the sidewall 156, and can further provide a welding location for joining the sidewall 156 to the base plate 154. In the example shown, the frame 152, base plate 154, and frame 152 are formed from a metal material and are welded together. Other types of material and securement methods are possible. One or more of the components could be formed from a polymeric material, such as an injection molded plastic.

The container holder 150 can further include a pair of coupling members 158 attached to the frame 152, a pair of brackets 160 for mounting the container holder 150 to the wheeled chassis 102, a pair of bolt assemblies 162 for rotatably securing the coupling members 158 to the brackets 160, and a lock mechanism 164. Alternatively, a rivet pin with a clip retainer can be used. As explained in more detail later, the lock mechanism 164 selectively locks the coupling members 158 with respect to the brackets 160 such that the container holder 150 can be selectively retained in the extended and storage positions. In one example, and as shown at FIG. 25, the coupling members 158 are provided with an integral stem portion that inserts into the ends 152*a*, 152*b* of the frame 152 and is secured with fasteners 153. In some examples, the coupling member 158 and frame 152 can be formed together as a single component from a metal material or from a polymeric material, such as injection molded plastic. In some examples, the coupling members 158 and/or frame 152 are formed from different materials. For example, the coupling members 158 could be formed from a polymeric material and the frame 152 could be formed from a metal material, or vice-versa. In some examples, the coupling members 158 are secured to the frame 152 by welding, fasteners, and/or an adhesive. In the example shown, the brackets 160 are formed from a metal material, although other materials such as polymeric materials can be used to form the brackets 160. The container holder 150 can also include a strap 166, also shown at FIG. 1, removably connected to the sidewall 156 to secure the container 130 to the container holder 150. In one example, the strap 166 is a rubber bungee-type cord with hooks provided at each end.

With reference to FIGS. 15 to 24, the container holder base plate 154 and sidewall 156 define a receptacle 158 for receiving and securing the container holder 150. In one aspect, the bottom of the container 130 is supported by the base plate 154 and the sidewall 156 surrounds at least a portion of the outside surface or sidewall of the container 130. In some examples, the sidewall 156 can be provided with a shape that is complementary to the outside surface of the container 130. In the example shown, the sidewall 156 is provided with a semi-circular or arc-shape to generally match the outer perimeter of a standard five gallon bucket. In the example shown, the base plate 154 is sized and arranged to support only a portion of the bottom surface of the container 130. In one arrangement, the sidewall 156 can be provided with an enclosed shape, such as a cylindrical shape or frusto-conical shape, such that the sidewall 156 completely surrounds the outer perimeter of the container 130. In one arrangement, the base plate 154 can be sized to completely support the entire bottom surface of the container 130. In one aspect, the sidewall 156 is provided with a pair of anchor points 156*a* for receiving ends 166*a* of the strap 166, which are shown as being configured as hooks.

As most easily seen at FIG. 25, each bracket 160 is shown as having a U-shaped main body 160*a* having a pair of extensions 160*b* extending from a base portion 160*c*, wherein each of the extensions 160*b* defines a first opening 160*d* for receiving the axle 106. As shown, one of the extensions 160*b* is also provided with a second opening 160*e*, a third opening 160*f*, and a fourth opening 160*g*. In one aspect, the main body 160*a* is shaped to support a chassis tube 102*a* at a complementarily shaped, curved top surface 160*h*, wherein the brackets 160 can be welded to the chassis tubes 102*a* at this location. As the axle 106 and wheeled chassis 102 are supported by both the brackets 160, a relatively strong structural connection between the container holder 150 and the wheeled chassis 102 results. Other arrangements are possible, such as an arrangement where separate clamps and/or fasteners are used to secure the brackets 160 to the wheeled chassis 102.

As most easily seen at FIGS. 25 to 30, the coupling members 158 are shown as having a main body 158*a* defining a first central aperture 158*b* and a second offset aperture 158*c*. When each coupling member 158 is positioned between the bracket extensions 160*b*, the first central aperture 158*b* is aligned with the bracket second openings 160*e*, thereby allowing the bolt assembly 162 to pass through the apertures 158*b*, 160*e* to secure the coupling member 158 to the bracket 160. Once connected, the container holder 150 pivots about an axis X that passes through the center of the apertures 158*b*, 160*e* and the bolt assemblies 162. The second offset aperture 158*c* of each of the coupling members 158 is sized to receive the lock mechanism 164. This configuration is most clearly illustrated at FIG. 22, where it can be seen that the offset aperture 158*c* is provided with a bottom portion 158*e* against which a spring 164*a* of the lock mechanism 164 acts.

Figure 16:
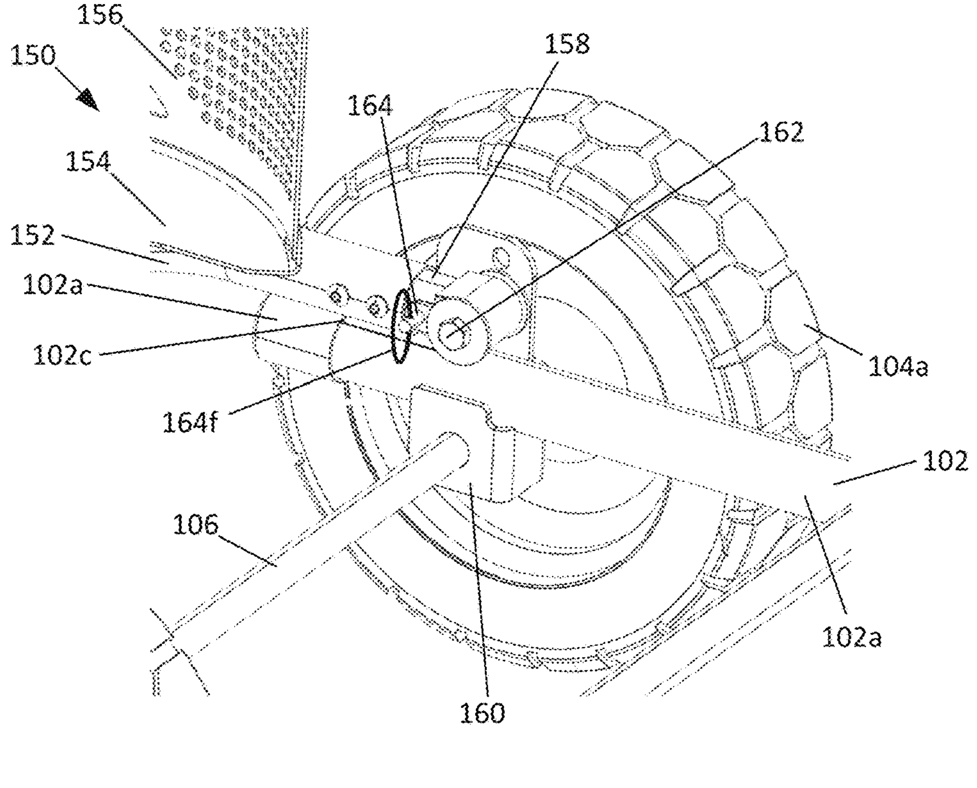
FIG. 16 is an enlarged perspective view of the mobile pressure washer shown in FIG. 15.
Figure 17:
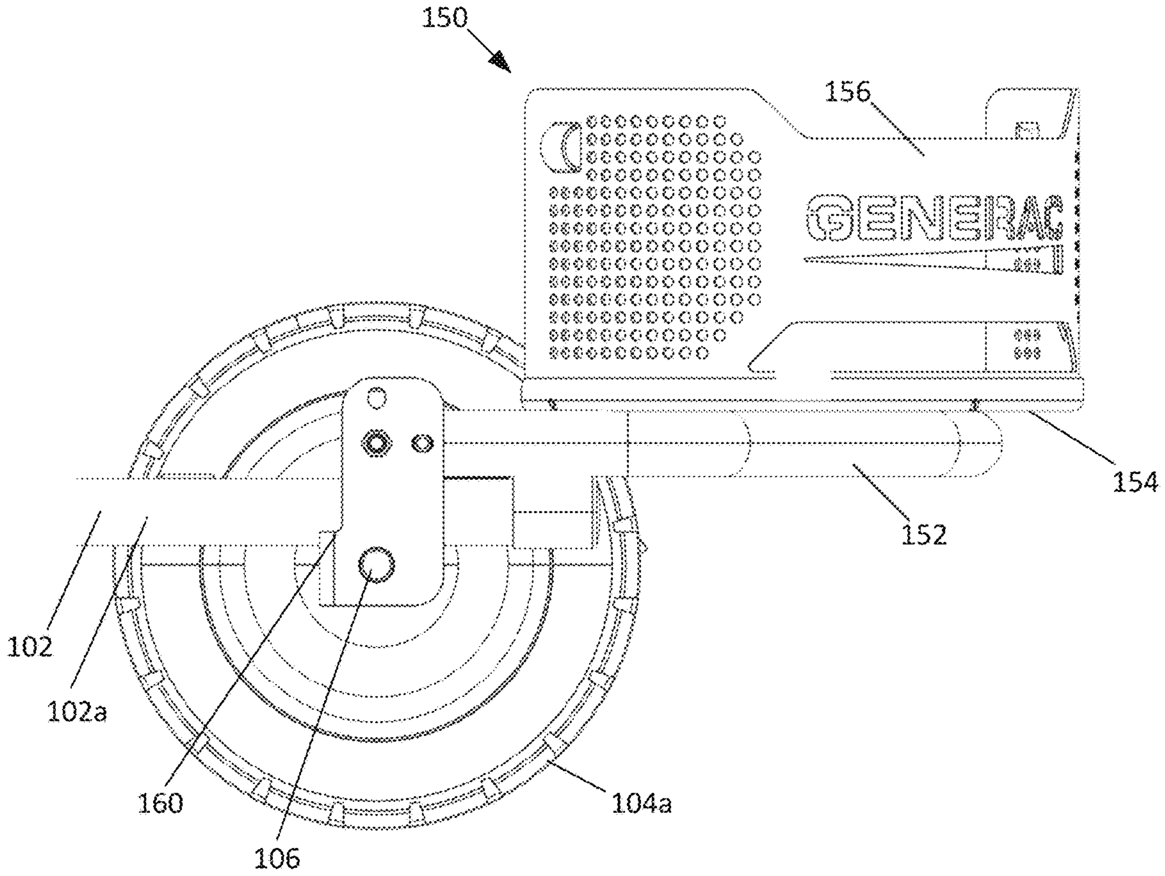
FIG. 17 is a side view of a portion of the of the mobile pressure washer shown in FIG. 1, with the container holder in the extended position.
Figure 18:
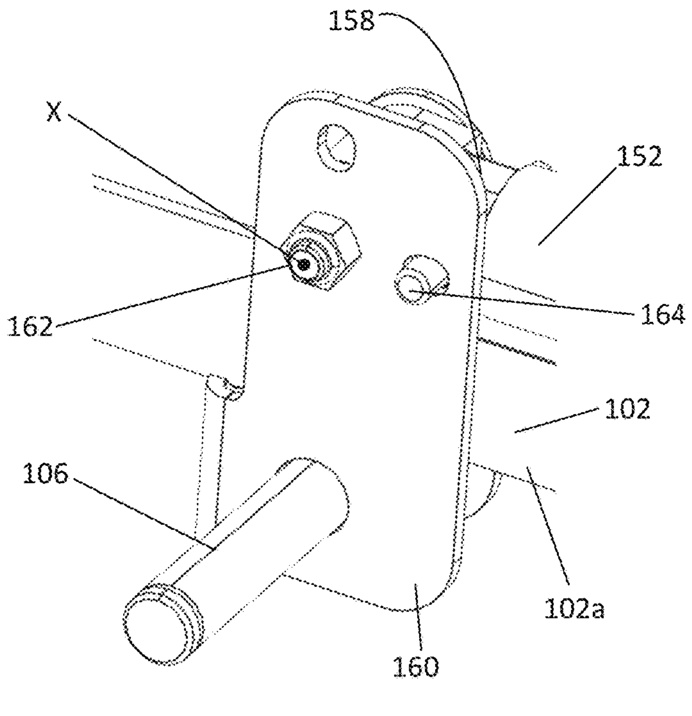
FIG. 18 is an enlarged perspective view of the mobile pressure washer shown in FIG. 17.

In one aspect, the lock mechanism 164 further includes a lock member 164*b* defining a main portion 164*c*, a stem portion 164*d* extending from the main portion 164*c*, and a head portion 164*e* extending from an opposite side of the main portion 164*c*. As configured, the stem portion 164*d* extends within the spring 164*a* such that the spring 164*a* is compressed against the main portion 164*c*, which has a diameter larger than that of the stem portion 164*d*, and the bottom portion 158*e* of the offset aperture 158*c*. Accordingly, the lock member 164*b* is biased into the locked position by the spring 164*a*. In one example, the bracket third and fourth openings 160*f*, 160*g* can have a diameter that is less than that of the main portion 164*c* but that is large enough to allow the head portion 164*e* to pass through the openings 160*f*, 160*g*. With such a configuration, the bracket extension 160*b* can act as a stop for the lock mechanism 164. In one aspect, the spring 164*a* biases the lock member main body 164*c* against the interior-side bracket extension 160*b* such that the head portion 164*e* extends through the interior-side opening 160*f* or 160*g*. The head portion 164*e* extends through the bracket interior-side opening 160*f* when the container holder 150 is in the extended position. In one aspect, and as illustrated at FIG. 16, the lock mechanism 124 can include a pull-tab or ring 164*f* connected to the lock member main body 164*c*. The pull-tab or ring 164*f* serves as a handle for an operator to pull the lock mechanism 164 against the force of the spring 164*a* and out of the locked position. Other methods of holding the container holder 150 in the folded and extended positions are also possible, for example, an arrangement could be provided in which the container holder 150 is indexed into either position by overcoming a frictional or spring force by rotating the container holder 150 without the use of pins.

To position the container holder 150 into the retracted or folded position, or vice-versa, an operator pulls the lock mechanism stem portion 164*d*, via the pull-tab or ring 164*f*, in a direction away from the adjacent wheel 104*a* (i.e. towards the interior) a sufficient distance to allow the frame 152 and coupling member 158 to be rotated with respect to the bracket 160. Once the container holder 150 is moved out of the extended or storage position, the head portion 164*e* will ride against the interior surface of the bracket extension 160*b* until the container holder 150 rotates into the extended or storage position, at which point the force of the spring 164*a* will drive the head portion 164*e* into the associated opening 160*f*, 160*g*.

With reference to FIGS. 15 to 18, it is noted that, when the container holder 150 is in the extended position, the frame 152 rests on the chassis tubes 102*a* such that that the container holder 150 is provided with sufficient structural support for holding a container 130 full of fluid. In the example shown, the chassis tubes 102*a* are provided with a rubber cap 102*b* and support or wear pads 102*c* that prevent metal-to-metal contact between the frame 152 and the wheeled chassis 102. These components can also function as vibration isolators. In an alternative arrangement, the container holder 150 is fixed such that the container holder 150 is permanently locked in the extended position (and cannot pivot to a storage position). In such a configuration, the frame 152 can be, for example, welded or mechanically fastened to the chassis tubes 102*a* or integrally formed with the chassis tubes 102*a*. In one aspect, the container holder 150 is positioned to maintain a low center of mass so that the pressure washer 100 is stable and is not prone to tipping, whether the container holder 150 is retracted, or whether the container holder 150 is in use and supported a container 130 full of chemical solution. In some embodiments the base plate 154 of the container holder 150 is positioned below one or more of: a top of the pressure washer 100, a top of the power plant 110, a top of the pump 112, a top of the panel 140, a top of one or more of the wheels 104. In some embodiments the base plate 154 has a height that is between a height of an axle 106 of at least one wheel 104*a* and a top of that at least one wheel 104*a*. In some embodiments, the container holder 150 is arranged to one side of the axle 106 of at least two wheels 104*a*, such that room is created at the centerline of the washer 100 for access to other components, for example, such that the water inlet hose 116 can be more easily connected to port 114*a*. In some embodiments, the container holder 150 rotates about an axis that is vertically above the axle 106. In some embodiments, the container holder 150 rotates about an axis such that the container holder 150 extends beyond a front end of the wheels 104*a* when in the extended position and such that the container holder 150 is behind a front end of the wheels 104*a* when in the retracted or folded position. In some embodiments, the container holder 150 rotates about an axis such that that frame 152 is in a horizontal position when in the extended position and such that the frame 152 is in a vertical position when in the retracted or folded position. In some embodiments, the extended and storage positions of the container holder 150 are separated by an angle of about 90 degrees. In some embodiments, the base plate 154 is configured such that, when the container holder 150 is in the retracted or folded position, the base plate 154 does not obstruct access to a front side of the pump 112 or the manifold 114, wherein the hose 116 can extend through the frame 152.

In one aspect, bushings 162*d* are inserted into the central apertures 158*b* to prevent metal-to-metal contact between the bolts 162 and the coupling members 158, thereby providing a more durable and low friction arrangement. Washers 162*c* can also be provided to reduce friction between the brackets 160 and the coupling members 158. In one aspect, the coupling members 158 are also shown as including an extended main body 158*a* which can be fitted inside of the tubular frame 152. Such an arrangement provides for a stronger and therefore more durable and reliable connection between the coupling member 158 and the tubular frame 152. The coupling member 158 and tubular frame 152 can further include holes 158*d*, 152*c*, respectively, for receiving fasteners 153 such that the coupling member 158 and be fully secured to the tubular frame 152. In one example, the holes 158*d* are threaded holes and the fasteners 153 are threaded fasteners 153. Other arrangements are possible, for example, bolt assemblies can be provided and/or a fastenerless connection can be provided via welding or adhesives.

Referring to FIGS. 31 to 34, the handle assembly 124 is shown in further detail. In one aspect, the handle assembly 124 includes a U-shaped handle 125, configured with a central handle portion 125*a* and a pair of parallel extensions 125*b*. As described previously, the handle 125 is movable between an extended position, as shown at FIGS. 1 to 8 and FIG. 32, and a storage position, as shown at FIGS. 9 to 14 and 33. This rotation is enabled by a coupling arrangement including many of the same components already described for the container holder 150. For example, the coupling arrangement includes the coupling members 158, fasteners 153, bolts 162*a*, nuts 162*b*, washers 162*c*, bushings 162*d*, and the lock mechanism 164 including the lock member 164*b* and the spring 164*a*. Accordingly, these features need not be further described here. In contrast to the container holder 150, the parallel extensions 125*b* are coupled to a common bracket 161 instead of a pair of brackets. The bracket 161, is mounted to the wheeled chassis 102, for example by welding, and includes a main body 161*a* with a pair of extensions 161*b*. Each of the extensions 161*b* includes an aperture 161*e* for receiving bolts 162*a*, thereby allowing the handle 125 to be pivotally mounted to the bracket 160 and rotatable about an axis Y coaxial with a centerline of the bolts 162*a*. One of the extensions 161*b* is provided with apertures 161*f* and 161*g* that engage with the lock mechanism 164 such that the handle 125 can be selectively locked into either the storage or extended position. On the other extension 161*b*, an arc-shaped guide path 162*h* is provided. A pin 165 is provided in the corresponding coupling member 158 and extends through the offset aperture 158*c* of the coupling member. The pin 165 extends into the guide path 161*h* of the extension 161*b*. The pin 165 and guide path 161*h* function to provide the handle 125 with a more controlled and stable movement as the handle 125 moves between positions. In one aspect, the ends of the guide path 161*h* can function as positive limiting stops such that the extended and storage positions of the handle 125 are clearly defined and not solely reliant on the proper functioning of the lock mechanism 164.

Example of FIGS. 35 to 48

Referring to FIGS. 35 to 48, a second example of a pressure washer 100' is shown and described. The pressure washer 100' shares many features in common with the pressure washer 100, and similar reference numbers are therefore utilized. Where features are generally the same, the description for such features need not be repeated here, and instead the primary differences will be discussed. In one aspect, the pressure washer 100' includes a different design for the handle 124 in which the handle 124 remains rotatable between storage and extended positions, but is provided without a lock mechanism. An alternative panel design 140 is also provided.

Figure 40:
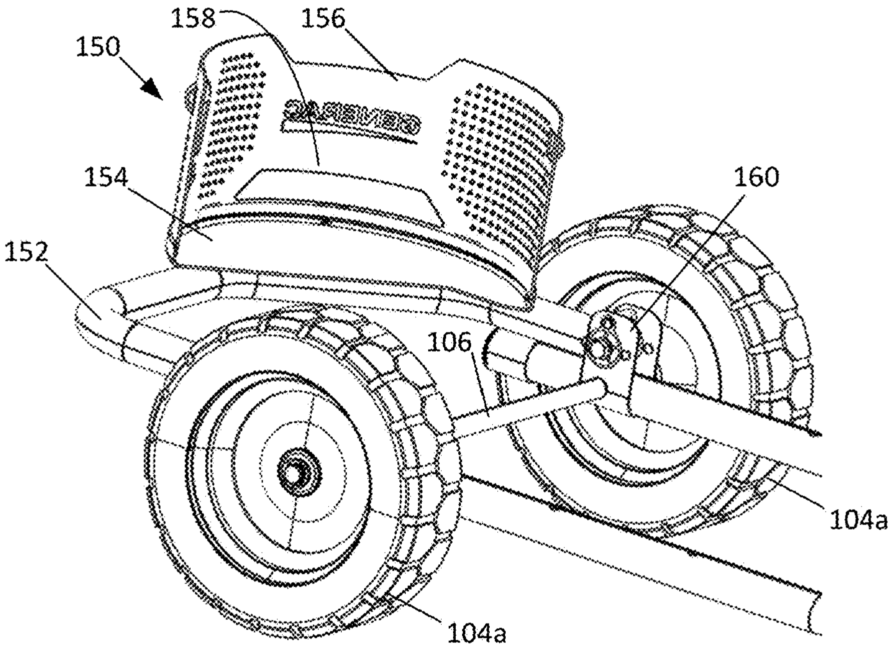
FIG. 40 is a partial perspective side view of portions of the mobile pressure washer of FIG. 35 including the chassis and wheels, and showing the container holder in the extended position.
Figure 41:
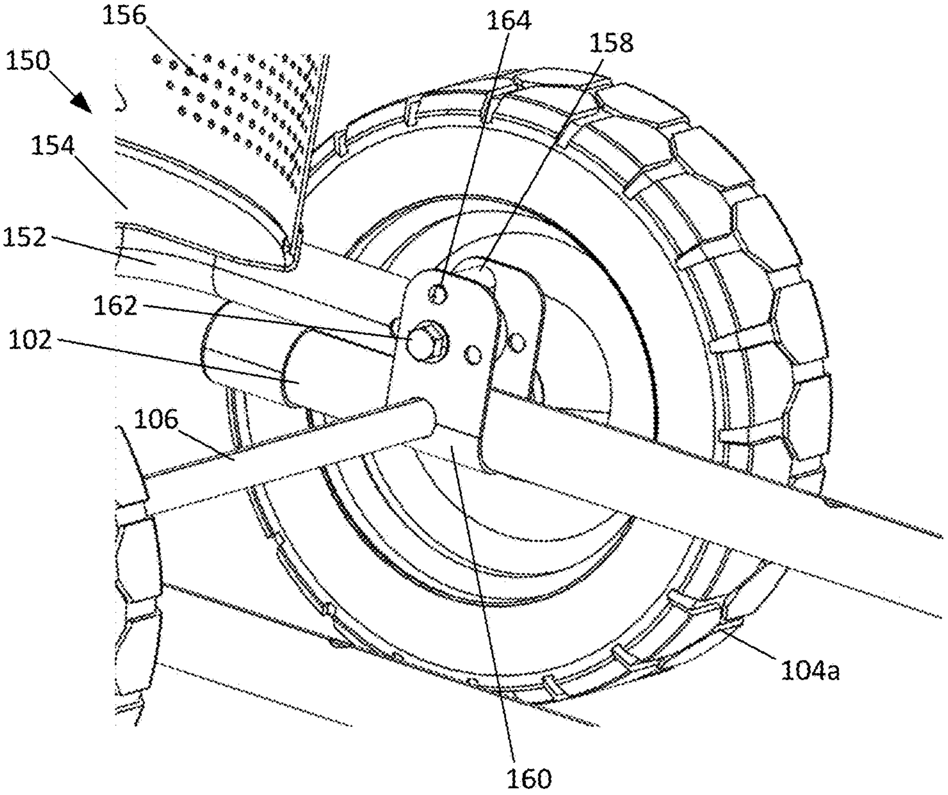
FIG. 41 is an enlarged view of a portion of the pressure washer shown in FIG. 40.
Figure 42:
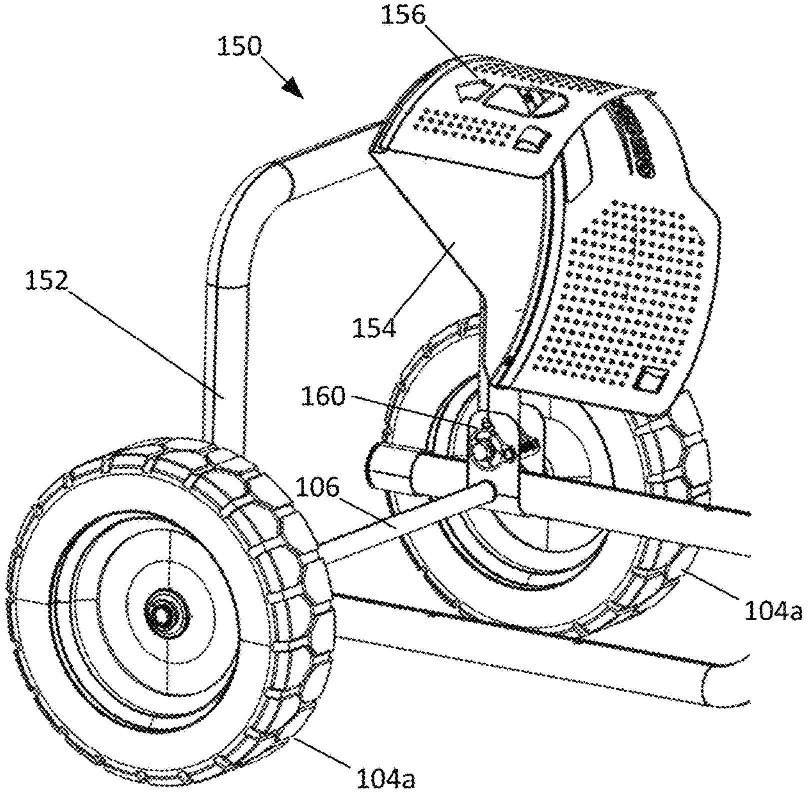
FIG. 42 is a partial perspective side view of portions of the mobile pressure washer of FIG. 35 including the chassis and wheels, and showing the container holder in the storage position.
Figure 43:
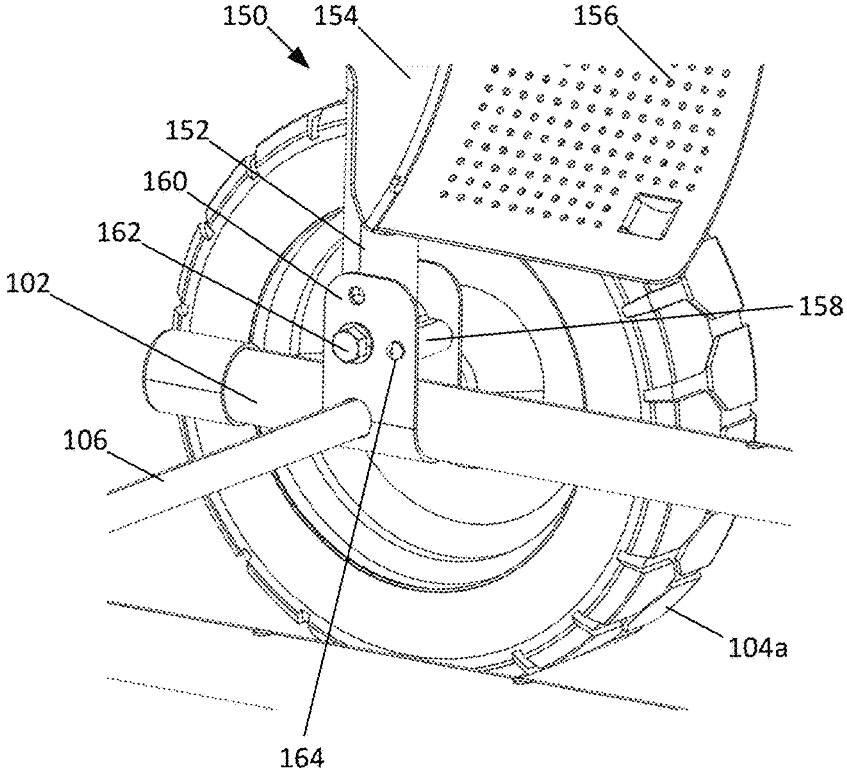
FIG. 43 is an enlarged view of a portion of the pressure washer shown in FIG. 42.
Figure 44:
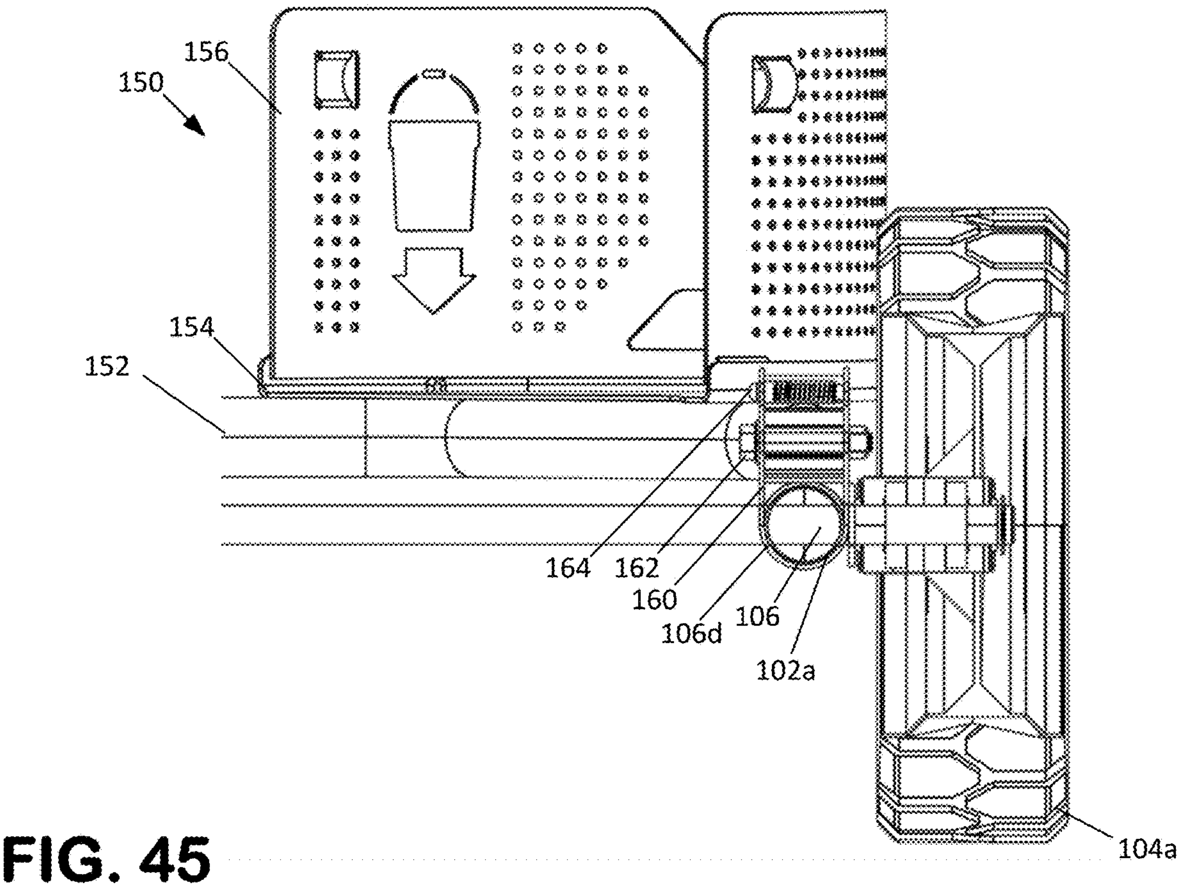
FIG. 44 is a partial cross-sectional front view of the pressure washer shown in FIG. 35.
Figure 45:
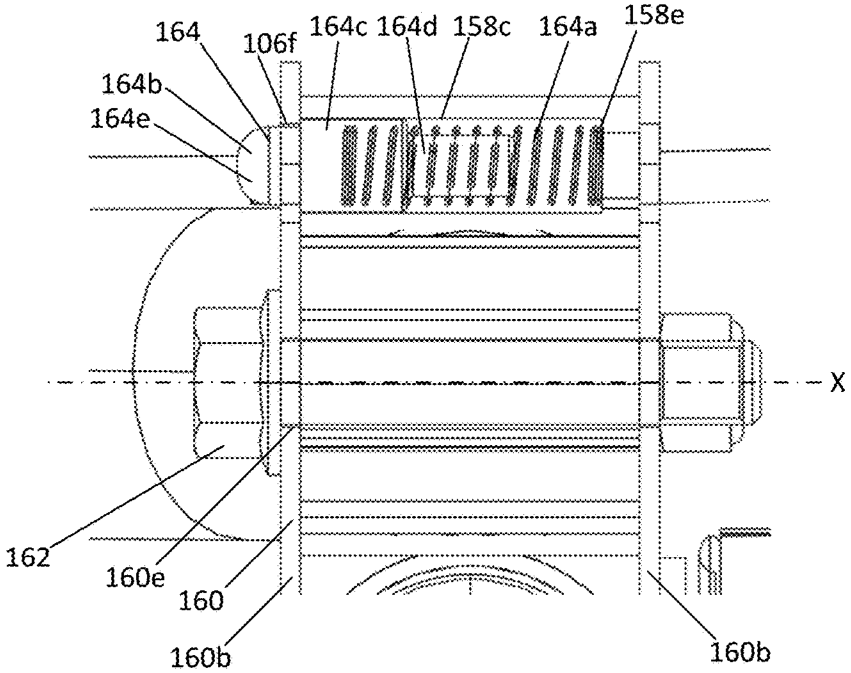
FIG. 45 is an enlarged view of a portion of the pressure washer shown in FIG. 44.
Figure 46:
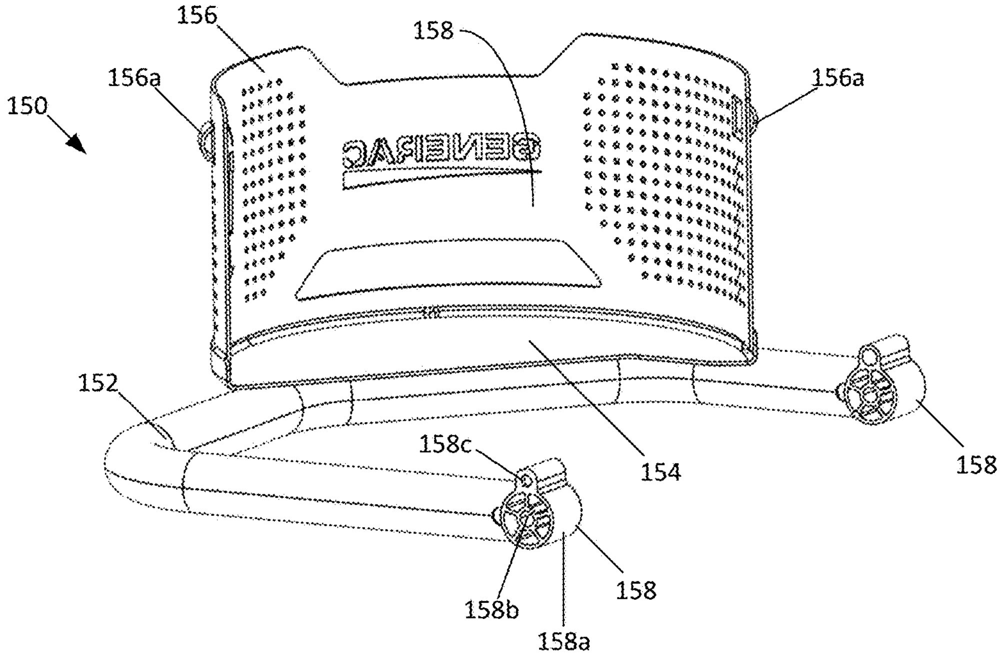
FIG. 46 is a perspective front view of the container holder of the pressure washer shown in FIG. 35.
Figure 47:
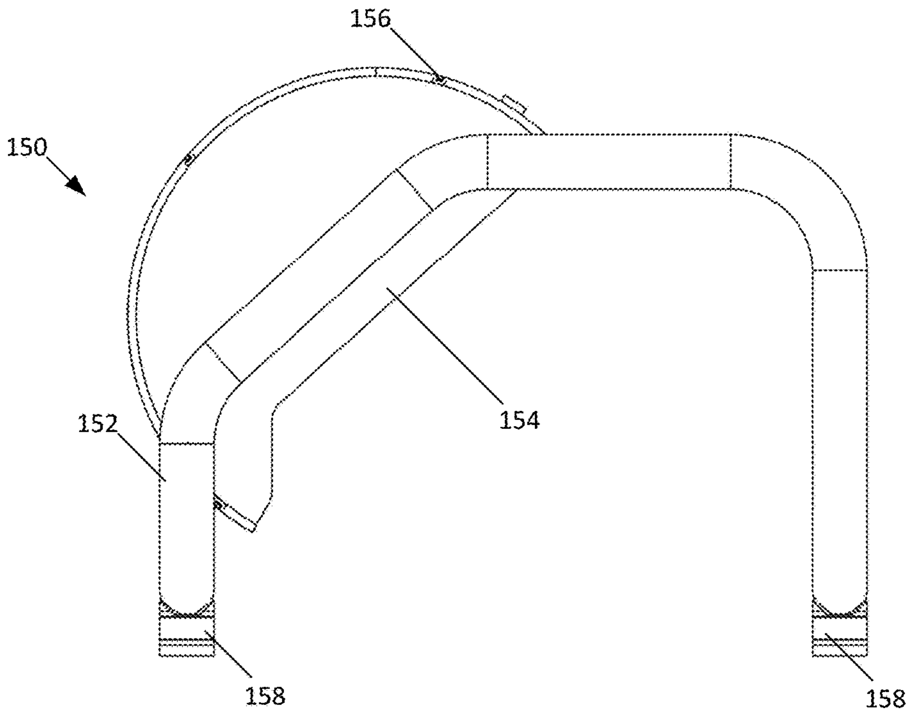
FIG. 47 is a bottom view of the container holder shown in FIG. 46.
Figure 48:
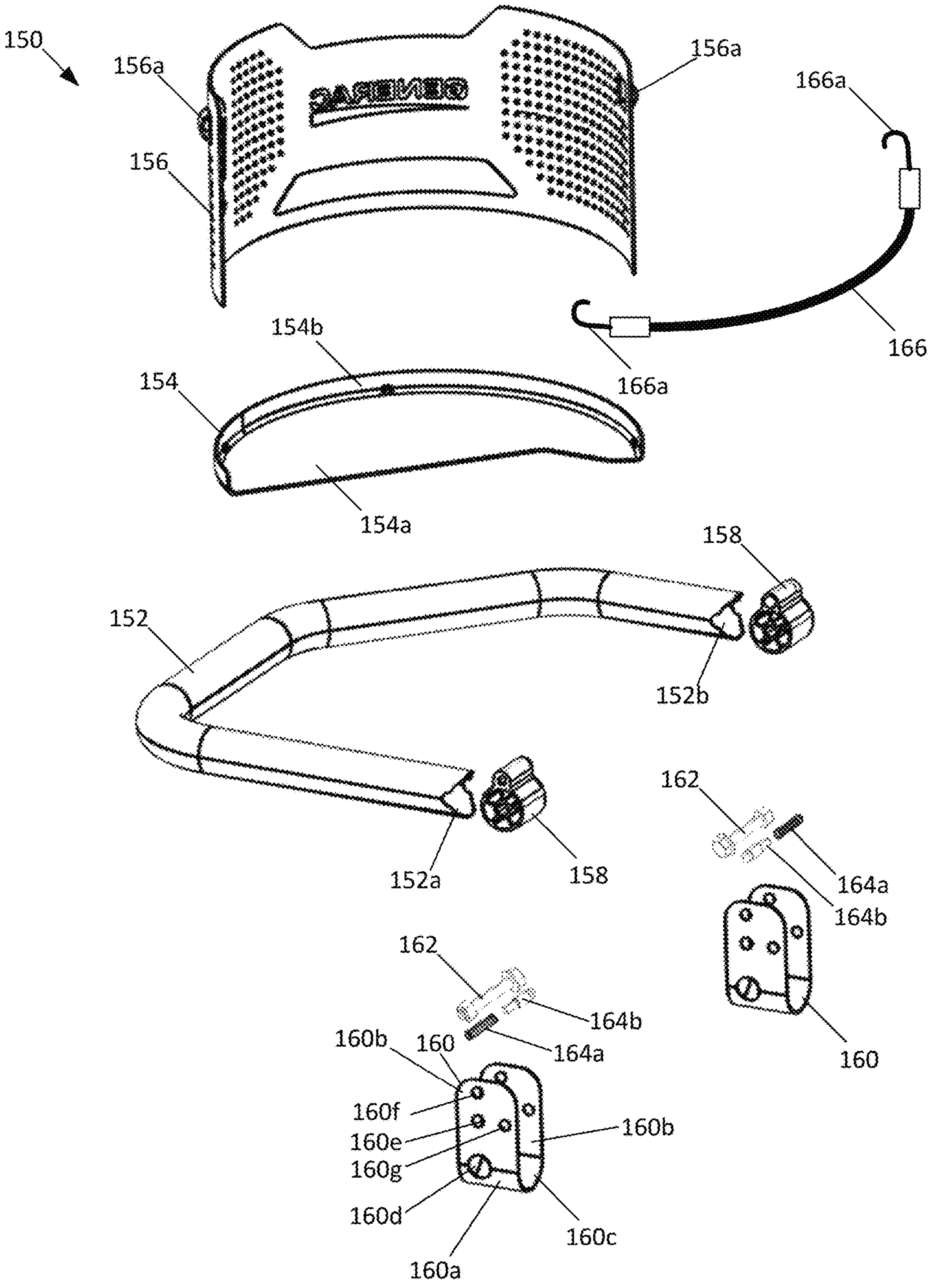
FIG. 48 is an exploded perspective view of the container holder and coupling arrangement of the pressure washer shown in FIG. 35.

A primary difference of the pressure washer 100' over the pressure washer 100 is that the configuration for coupling and locking the container holder 150 to the wheeled chassis 102 is presented, as is most clearly presented at FIGS. 40 to 48. FIGS. to 41 show the container holder 150 in the extended position while FIGS. 42 to 43 show the container holder 150 in the retracted or storage position. FIGS. 44 and 45 show cross-sectional views of the container holder 150 while FIGS. 46 and 47 show the container holder 150 in isolation from the pressure washer 100. FIG. 48 shows an exploded view of the container holder 150.

As most easily seen at FIG. 48, the container holder 150 can include a generally U-shaped tubular frame 152 extending between a first end 152*a* and a second end 152*b*, a base plate 154 secured to the frame 152, such as by welding, and a sidewall 156 extending from the base plate 154. In one aspect, the base plate 154 is provided with a base portion 154*a* and a lip portion 154*b*, wherein the lip portion 154*b* supports and overlaps with the sidewall 156, and can further provide a welding location for joining the sidewall 156 to the base plate 154. In the example shown, the frame 152, base plate 154, and frame 152 are formed from a metal material and are welded together. Other types of material and securement methods are possible. One or more of the components could be formed from a polymeric material, such as an injection molded plastic. The container holder 150 can further include a pair of coupling members 158 attached to the frame 152, a pair of brackets 160 for mounting the container holder 150 to the wheeled chassis 102, a pair of bolt assemblies 162 for rotatably securing the coupling members 158 to the brackets 160, and a pair of lock mechanisms 164. Alternatively, a rivet pin with a clip retainer can be used. As explained in more detail later, the lock mechanisms 164 selectively lock the coupling members 158 with respect to the brackets 160 such that the container holder 150 can be selectively retained in the extended and storage positions. In the example shown, the coupling members 158 are formed from a metal material and welded to the frame 152. Other arrangements are possible, as discussed previously with respect to the first described embodiment. In the example shown, the brackets 160 are formed from a metal material, although other materials such as polymeric materials can be used to form the brackets 160. The container holder 150 can also include a strap 166, removably connected to the sidewall 156 to secure the container 130 to the container holder 150. In one example, the strap 166 is a rubber bungee-type cord with hooks provided at each end.

With reference to FIGS. 40 to 48, the container holder base plate 154 and sidewall 156 define a receptacle 158 for receiving and securing the container 150. In one aspect, the bottom of the container 130 is supported by the base plate 154 and the sidewall 156 surrounds at least a portion of the outside surface or sidewall of the container 130. In some examples, the sidewall 156 can be provided with a shape that is complementary to the outside surface of the container 130. In the example shown, the sidewall 156 is provided with a semi-circular or arc-shape to generally match the outer perimeter of a standard five gallon bucket. In the example shown, the base plate 154 is sized and arranged to support only a portion of the bottom surface of the container 130. In one arrangement, the sidewall 156 can be provided with an enclosed shape, such as a cylindrical shape or frustoconical shape, such that the sidewall 156 completely surrounds the outer perimeter of the container 130. In one arrangement, the base plate 154 can be sized to completely support the entire bottom surface of the container 130. In one aspect, the sidewall 156 is provided with a pair of anchor points 156*a* for receiving ends 166*a* of the strap 166, which are shown as being configured as hooks.

As most easily seen at FIG. 48, each bracket 160 is shown as having a U-shaped main body 160*a* having a pair of extensions 160*b* extending from a bottom, curved portion 160*c*, wherein each of the extensions 160*b* defines a first opening 160*d*, a second opening 160*e*, a third opening 160*f*, and a fourth opening 160*g*. As most clearly illustrated at FIG. 14, the main body 160*a* is shaped to receive a chassis tubes 102*a* on each side of the wheeled chassis 102 at the location of the axle 106, such that the extensions 160*b* extend on each side of the chassis tube 102*a* and the axle 106 passes through the first openings 106*d* of the bracket 160. As the brackets 160 are welded to the chassis tubes 102*a*, the axle 106 is supported by both the brackets 160 and the chassis tubes 102*a*, thereby providing for a relatively strong structural connection between the container holder 150 and the wheeled chassis 102. Other arrangements are possible, such as an arrangement where separate clamps and/or fasteners are used to secure the brackets 160 to the wheeled chassis 102.

As most easily seen at FIGS. 46 and 48, the coupling members 158 are shown as having a main body 158*a* defining a first central aperture 158*b* and a second offset aperture 158*c*. When each coupling member 158 is positioned between the bracket extensions 160*b*, the first central aperture 158*b* is aligned with the bracket second openings 160*e*, thereby allowing the bolt assembly 162 to pass through the apertures 158*b*, 160*e* to secure the coupling member 158 to the bracket 160. Once connected, the container holder 150 pivots about an axis X that passes through the center of the apertures 158*b*, 160*e* and the bolt assemblies 162. The second offset aperture 158*c* of each of the coupling members 158 is sized to receive the lock mechanism 164. This configuration is most clearly illustrated at FIG. 45, where it can be seen that the offset aperture 158*c* is provided with a bottom portion 158*e* against which a spring 164*a* of the lock mechanism 164 acts. The lock mechanism 164 further includes a lock member 164*b* defining a main portion 164*c*, a stem portion 164*d* extending from the main portion 164*c*, and a head portion 164*e* extending from an opposite side of the main portion 164*c*. As configured, the stem portion 164*d* extends within the spring 164*a* such that the spring 164*a* is compressed against the main portion 164*c*, which has a diameter larger than that of the stem portion 164*d*, and the bottom portion 158*e* of the aperture 158*c*. As configured, the head portion 164*e* is rounded and has a diameter that is less than that of the main portion 164*c*. The bracket third and fourth openings 160*f*, 160*g* have a diameter that is less than that of the main portion 164*c* but that is large enough to allow the head portion 164*e* to pass through the openings 160*f*, 160*g*. Accordingly, the spring 164*a* biases the lock member main body 164*c* against the interior-side bracket extension 160*b* such that the head portion 164*e* extends through the interior-side opening 160*f* or 160*g*. As most easily seen at FIGS. 10 and 11, the head portion 164*e* extends through the bracket interior-side opening 160*f* when the container holder 150 is in the extended position.

To position the container holder 150 into the retracted or folded position, or vice-versa, an operator depresses the lock mechanism head portion 164*e* towards the interior-side opening 160*f* (or 160*g* if in the storage position) a sufficient distance to allow the frame 152 and coupling member 158 to be rotated with respect to the bracket 160. Once the container holder 150 is moved out of the extended or storage position, the head portion 164*e* will ride against the interior surface of the bracket extension 160*b* until the container holder 150 rotates into the extended or storage position, at which point the force of the spring 164*a* will drive the head portion 164*e* into the associated opening 160*f*, 160*g*. It is noted that since the head portion 164*e* is rounded, the head portion 164*e* need not be fully depressed through the openings 160*f*, 160*g* to unlock the container holder, as the rotational force being applied to the container holder 150 by the operator during positioning will drive the head portion 164*e* back through the opening 160*f*, 160*g* once the head portion 164*e* is initially depressed a sufficient distance by the operator.

With reference to FIGS. 40 and 41, it is noted that, when the container holder 150 is in the extended position, the frame 152 rests on the chassis tubes 102*a* such that that the container holder 150 is provided with sufficient structural support for holding a container 130 full of fluid. In the example shown, the chassis tubes 102*a* are provided with a rubber cap 102*b* that acts as an isolator to prevent metal to metal contact and absorbing vibrations. In an alternative arrangement, the container holder 150 is fixed such that the container holder 150 is permanently locked in the extended position (and cannot pivot to a storage position). In such a configuration, the frame 152 can be, for example, welded or mechanically fastened to the chassis tubes 102*a* or integrally formed with the chassis tubes 102*a*. In one aspect, the container holder 150 is positioned to maintain a low center of mass so that the pressure washer 100' is stable and is not prone to tipping, whether the container holder 150 is retracted, or whether the container holder 150 is in use and supported a container 130 full of chemical solution. In some embodiments the base plate 154 of the container holder 150 is positioned below one or more of: a top of the pressure washer 100', a top of the power plant 110, a top of the pump 112, a top of the panel 140, a top of one or more of the wheels 104. In some embodiments the base plate 154 has a height that is between a height of an axle 106 of at least one wheel 104*a* and a top of that at least one wheel 104*a*. In some embodiments, the container holder 150 is arranged to one side of the axle 106 of at least two wheels 104*a*, and the power plant 110 and pump 112 are arranged to the other side, so that the weight of the container 130 and container holder 150 is counter balanced by the weight of the power plant 110 and pump 112, as well as other components of the pressure washer 100'. In some embodiments, the container holder 150 rotates about an axis that is vertically above the axle 106. In some embodiments, the container holder 150 rotates about an axis such that the container holder 150 extends beyond a front end of the wheels 104*a* when in the extended position and such that the container holder 150 is behind a front end of the wheels 104*a* when in the retracted or folded position. In some embodiments, the container holder 150 rotates about an axis such that that frame 152 is in a horizontal position when in the extended position and such that the frame 152 is in a vertical position when in the retracted or folded position. In some embodiments, the extended and storage positions of the container holder 150 are separated by an angle of about 90 degrees. In some embodiments, the base plate 154 is configured such that, when the container holder 150 is in the retracted or folded position, the base plate 154 does not obstruct access to a front side of the pump 112 or the manifold 114, wherein the hose 116 can extend through the frame 152.

The various embodiments described above are provided by way of illustration only and should not be construed to limit the claims attached hereto. Those skilled in the art will readily recognize various modifications and changes that may be made without following the example embodiments and applications illustrated and described herein, and without departing from the full scope of the following claims.

What is claimed is:

1. A mobile pressure washer comprising:

a wheeled chassis including wheels and an axle;

a motor supported by the wheeled chassis;

a fluid pump coupled to and driven by the motor; and a container holder for receiving and supporting a container in fluid communication with the fluid pump, a weight of the container holder being arranged on an opposite side of the axle of the wheeled chassis from a weight of the motor;

wherein the container holder is movable between an extended position and a retracted position.

2. The mobile pressure washer of claim 1, wherein the weight of the container holder is arranged on an opposite side of the axle of the wheeled chassis from the weight of the motor in the extended position, and wherein the weight of the container holder is arranged over the axle of the wheeled chassis in the retracted position.

3. The mobile pressure washer of claim 1, wherein the container holder rotates between the extended position and the retracted position.

4. The mobile pressure washer of claim 3, wherein an axis of rotation of the container holder is arranged vertically above the axle.

5. The mobile pressure washer of claim 1, wherein the weight of the container, when received and supported on the container holder, is arranged on the opposite side of the axle of the wheeled chassis from the weight of the motor.

6. A mobile pressure washer comprising:

a wheeled chassis including wheels and an axle;

a motor supported by the wheeled chassis;

a fluid pump coupled to and driven by the motor; and a container platform for receiving and supporting a container in fluid communication with the fluid pump, a weight of the container platform being arranged on an opposite side of the axle of the wheeled chassis from a weight of the motor;

wherein the axle is a front axle, and wherein the mobile pressure washer further comprises a rear axle, wherein the motor is arranged on the wheeled chassis in between the front axle and the rear axle.

7. The mobile pressure washer of claim 6, wherein the container platform extends beyond a front end of the wheels, the wheels being connected to the front axle.

8. The mobile pressure washer of claim 7, wherein the container platform is movable between an extended position and a retracted position, and wherein the container platform is arranged behind the front end of the wheels when in the retracted position.

9. The mobile pressure washer of claim 8, wherein the extended position and the retracted position of the container platform are separated by an angle of about 90 degrees.

10. A mobile pressure washer comprising:

a wheeled chassis including wheels and an axle;

a motor supported by the wheeled chassis;

a fluid pump coupled to and driven by the motor; and a container holder for receiving and supporting a container in fluid communication with the fluid pump, the container holder being movable between an extended position and a retracted position, the container holder being arranged on an opposite side of the axle of the wheeled chassis from the motor when the container holder is in the extended position.

11. The mobile pressure washer of claim 10, wherein the container holder is arranged over the axle of the wheeled chassis in the retracted position.

12. The mobile pressure washer of claim 10, wherein the container holder rotates between the extended position and the retracted position.

13. The mobile pressure washer of claim 12, wherein the extended position and the retracted position of the container holder are separated by an angle of about 90 degrees.

14. The mobile pressure washer of claim 13, wherein an axis of rotation of the container holder is arranged vertically above the axle.

15. The mobile pressure washer of claim 10, wherein the axle is a front axle, and wherein the mobile pressure washer further comprises a rear axle, wherein the motor is arranged on the wheeled chassis in between the front axle and the rear axle.

16. The mobile pressure washer of claim 15, wherein the container holder extends beyond a front end of the wheels in the extended position, the wheels being connected to the front axle.

17. The mobile pressure washer of claim 16, wherein the container holder is arranged behind the front end of the wheels when in the retracted position.

18. The mobile pressure washer of claim 10, further comprising a lockable frame that selectively locks the container holder in the extended and retracted positions.

19. The mobile pressure washer of claim 10, wherein the container holder is sized and shaped to receive a 5-gallon bucket.

* * * * *